United States Patent
Wucherpfennig et al.

(10) Patent No.: US 12,448,456 B2
(45) Date of Patent: Oct. 21, 2025

(54) METHOD FOR PRODUCING SPESOLIMAB

(71) Applicant: Boehringer Ingelheim International GmbH, Ingelheim am Rhein (DE)

(72) Inventors: Thomas Wucherpfennig, Ingelheim am Rhein (DE); Rico Lippmann, Ingelheim am Rhein (DE)

(73) Assignee: Boehringer Ingelheim International GmbH, Ingelheim am Rhein (DE)

( * ) Notice: Subject to any disclaimer, the term of this patent is extended or adjusted under 35 U.S.C. 154(b) by 204 days.

(21) Appl. No.: 17/734,417

(22) Filed: May 2, 2022

(65) Prior Publication Data
US 2022/0356258 A1    Nov. 10, 2022

(30) Foreign Application Priority Data
May 3, 2021    (EP) ..................... 21171881

(51) Int. Cl.
  *C07K 16/28*    (2006.01)
(52) U.S. Cl.
  CPC ...... *C07K 16/2866* (2013.01); *C07K 2317/14* (2013.01); *C07K 2317/24* (2013.01); *C07K 2317/41* (2013.01)
(58) Field of Classification Search
  CPC ............ C07K 16/2866; C07K 2317/14; C07K 2317/24; C07K 2317/41
  See application file for complete search history.

(56) References Cited

U.S. PATENT DOCUMENTS

| | | | |
|---|---|---|---|
| 10,550,189 B2* | 2/2020 | Brown | G01N 33/564 |
| 2006/0115901 A1* | 6/2006 | Valamehr | C12N 5/0037 435/373 |
| 2013/0236471 A1* | 9/2013 | Brown | C07K 16/2866 435/252.31 |
| 2014/0234905 A1* | 8/2014 | Pla | C12N 5/0043 435/405 |
| 2014/0308273 A1* | 10/2014 | Carvalhal | C07K 16/22 435/69.6 |
| 2015/0203584 A1* | 7/2015 | Brown | C07K 16/2866 435/417 |
| 2016/0289633 A1 | 10/2016 | Yang et al. | |
| 2017/0298135 A9* | 10/2017 | Brown | G01N 33/564 |
| 2020/0207862 A1 | 7/2020 | Baum et al. | |

FOREIGN PATENT DOCUMENTS

WO    2016156476 A1    10/2016

OTHER PUBLICATIONS

Torkashvand F, Vaziri B. Main Quality Attributes of Monoclonal Antibodies and Effect of Cell Culture Components. Iran Biomed J. May 2017;21(3):131-41. doi: 10.18869/acadpub.ibj.21.3.131. Epub Apr. 20, 2017. PMID: 28176518; PMCID: PMC5392216. (Year: 2017).*
Pacis et al. "Effects of cell culture conditions on antibody N-linked glycosylation—what affects high mannose 5 glycoform". Biotechnology and Bioengineering. vol. 108, Issue10. Oct. 2011. pp. 2348-2358 (Year: 2011).*
Goyon et al. "Determination of isoelectric points and relative charge variants of 23 therapeutic monoclonal antibodies". Journal of Chromatography B vols. 1065-1066, Oct. 15, 2017, pp. 119-128. (Year: 2017).*
Ellingsen et al. Chapter 26—Copper. Handbook on the Toxicology of Metals (Third Edition). 2007, p. 529-546. Science Direct Summary. retrieved from: https://www.sciencedirect.com/topics/nursing-and-health-professions/copper#:~:text=Cu%20(0)%20is%20very%20stable,is%20stable%20in%20most%20environments. (Year: 2007).*
"Generation and functional characterization of anti-human and anti-mouse IL-36R antagonist monoclonal antibodies," Ganesan et al., mAbs, vol. 9, pp. 1143-1154 (Year: 2017).*
Ahlberg, Jennifer et al., "Retrospective analysis of model-based predictivity of human pharmacokinetics for anti- L-36R monoclonal antibody MAB92 using a rat anti-mouse IL-36R monoclonal antibody and RNA expression data (FANTOM5)", Mabs, 2019, vol. 11, No. 15, pp. 956-964.
Anonymous, "Abcd antibody spesolimab (ABCD_AH644)", Abcd Database, 2021, 1 page, retrieved from the Internet at https://web.expasy.org/abcd/ABCD_AH664.
Anonymous, "Pre-made Spesolimab biosimilar (Whole mAb, anti-IL36RN therapeutic antibody) - benchmark reference antibody", www.genemedi.net, 2021, pp. 1-3, retrieved from the internet: https://www.genemedi.net/i/ biologics-b-iosimilar-GMP-Bios-ab-532.
Anonymous, "Recommended International Nonproprietary Names for Pharmaceutical Substances (INN): List 81", WHO Drug Information, 2019, vol. 33, No. 1, pp. 114-115.
BRÜHLMANN, David et al., "Tailoring recombinant protein quality by rational media design", Biotechnol. Prog., 2015, vol. 31, No. 3, pp. 615-629.
Ganesan, Rajkumar et al., "Generation and functional characterization of anti-human and anti-mouse IL-36R antagonist monoclonal antibodies", MABS, 2017, vol. 9, No. 7, pp. 1143-1154.
Graham, Ryan J et al., "Consequences of trace metal variability and supplementation on Chinese hamster ovary (CHO) cell culture performance: A review of key mechanisms and considerations", Biotechnology and Bioengineering, 2019, 116, pp. 3446-3456.
Yuk, Inn H et al., "Effects of Copper on CHO Cells: Cellular Requirements and Product Quality Considerations", Biotechnol. Prog., 2015, vol. 31, No. 1, pp. 226-238.

(Continued)

*Primary Examiner* — Janet L Epps-Smith
*Assistant Examiner* — Nada Ahmed Mahmou Elmansy
(74) *Attorney, Agent, or Firm* — McNeill PLLC

(57) ABSTRACT

The present invention relates to a method for producing the anti-IL36R antibody spesolimab. More specifically, the present invention relates to a method of producing spesolimab with a serum-free cell culture medium in a fed-batch culture in the presence of reduced copper and increased iron concentrations. In addition, the present invention relates to a composition comprising low levels of basic species of spesolimab and/or low levels of spesolimab species with high mannose structures.

Figure 1A:
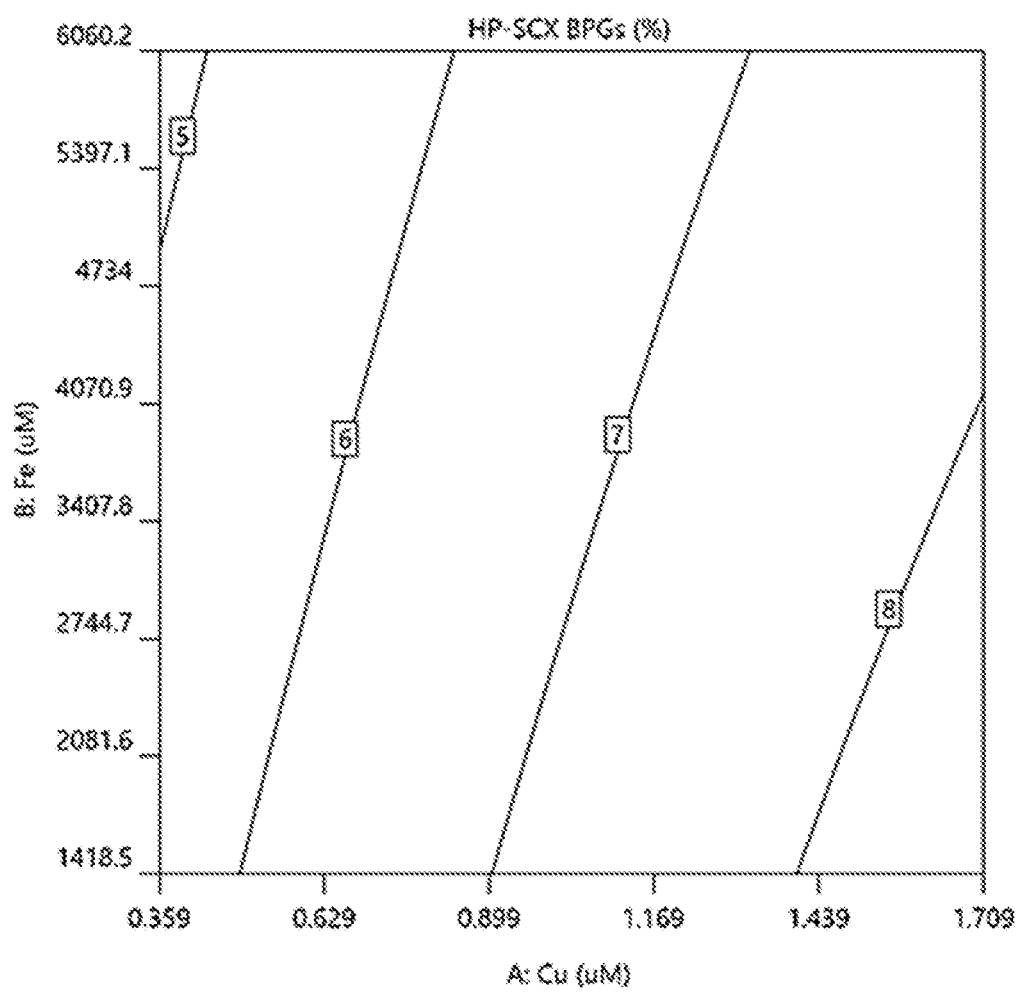
Figure 1B:
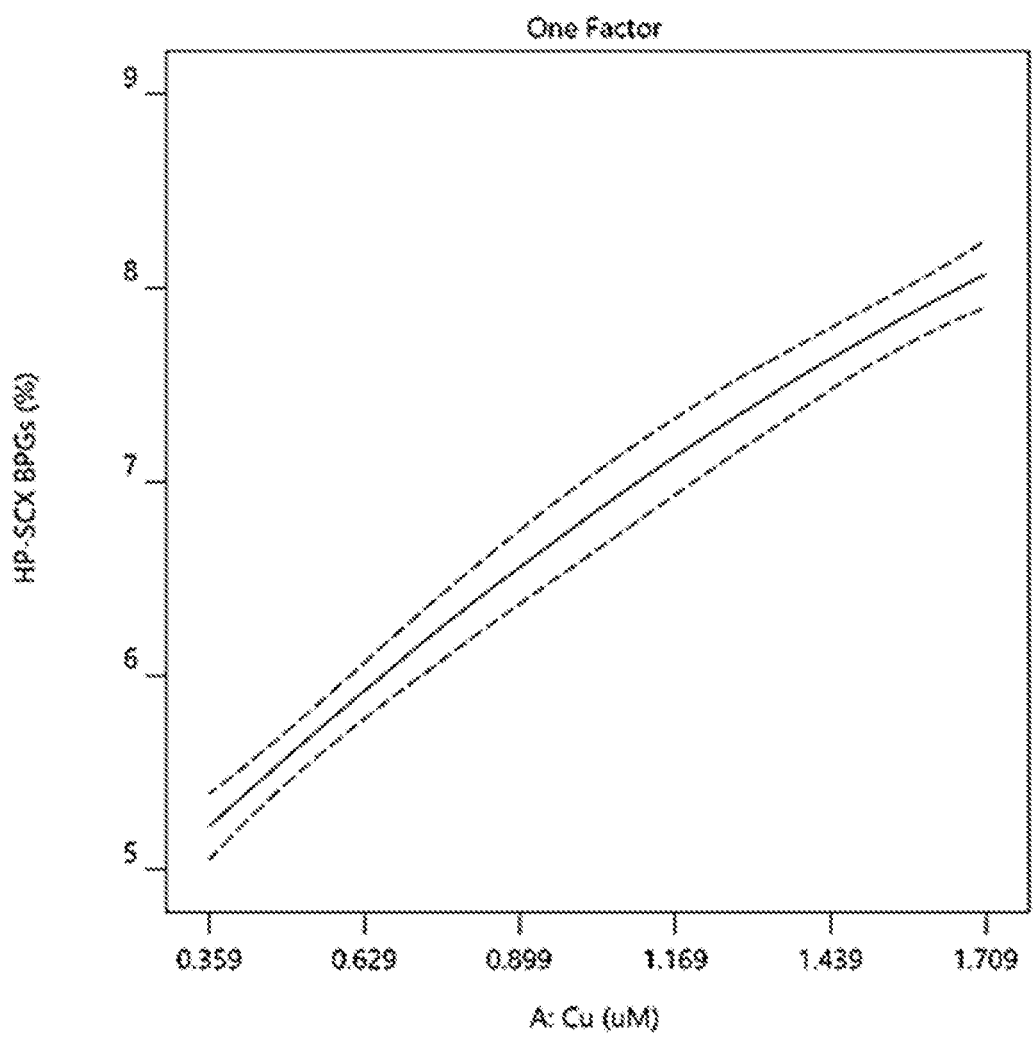
Figure 1C:
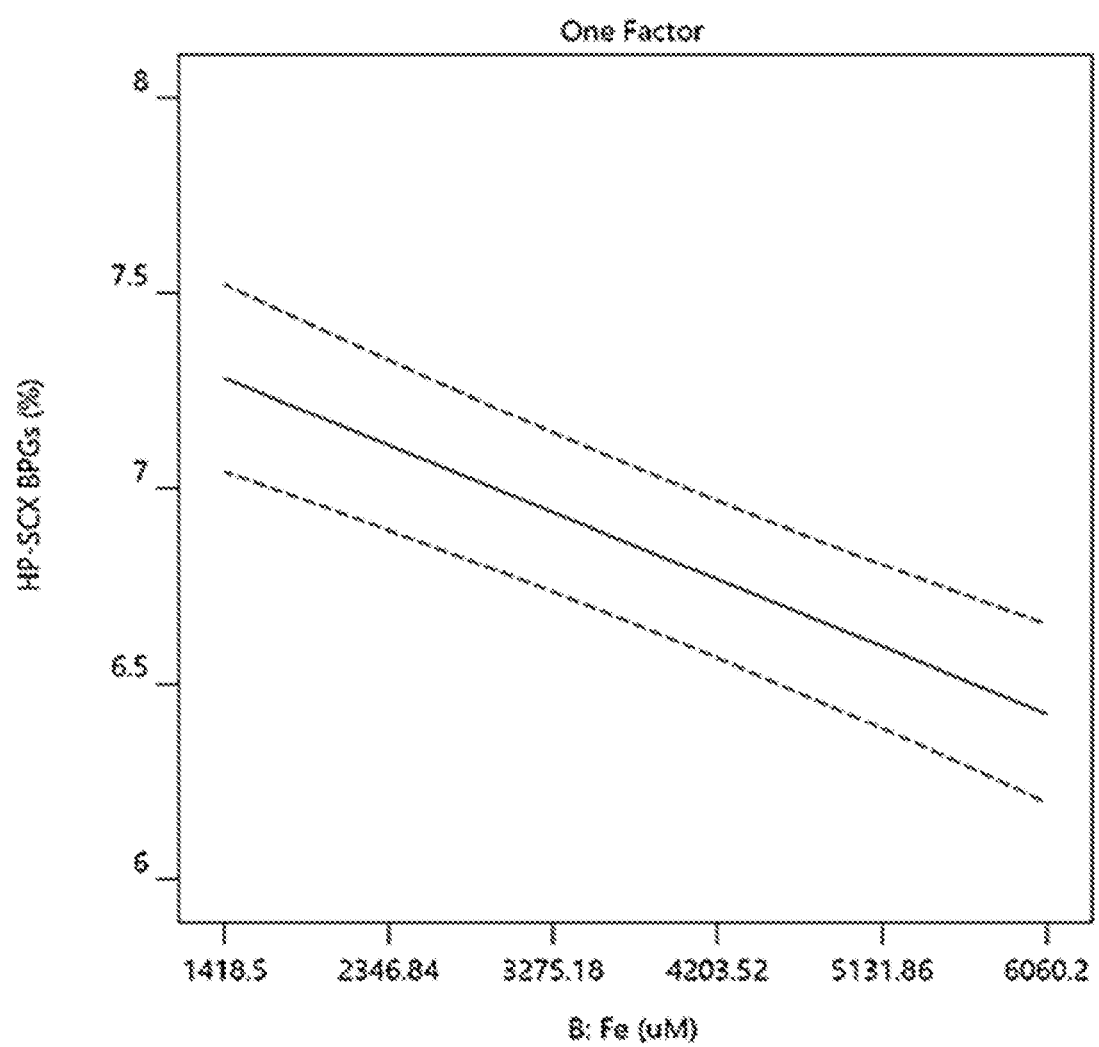
Figure 1D:
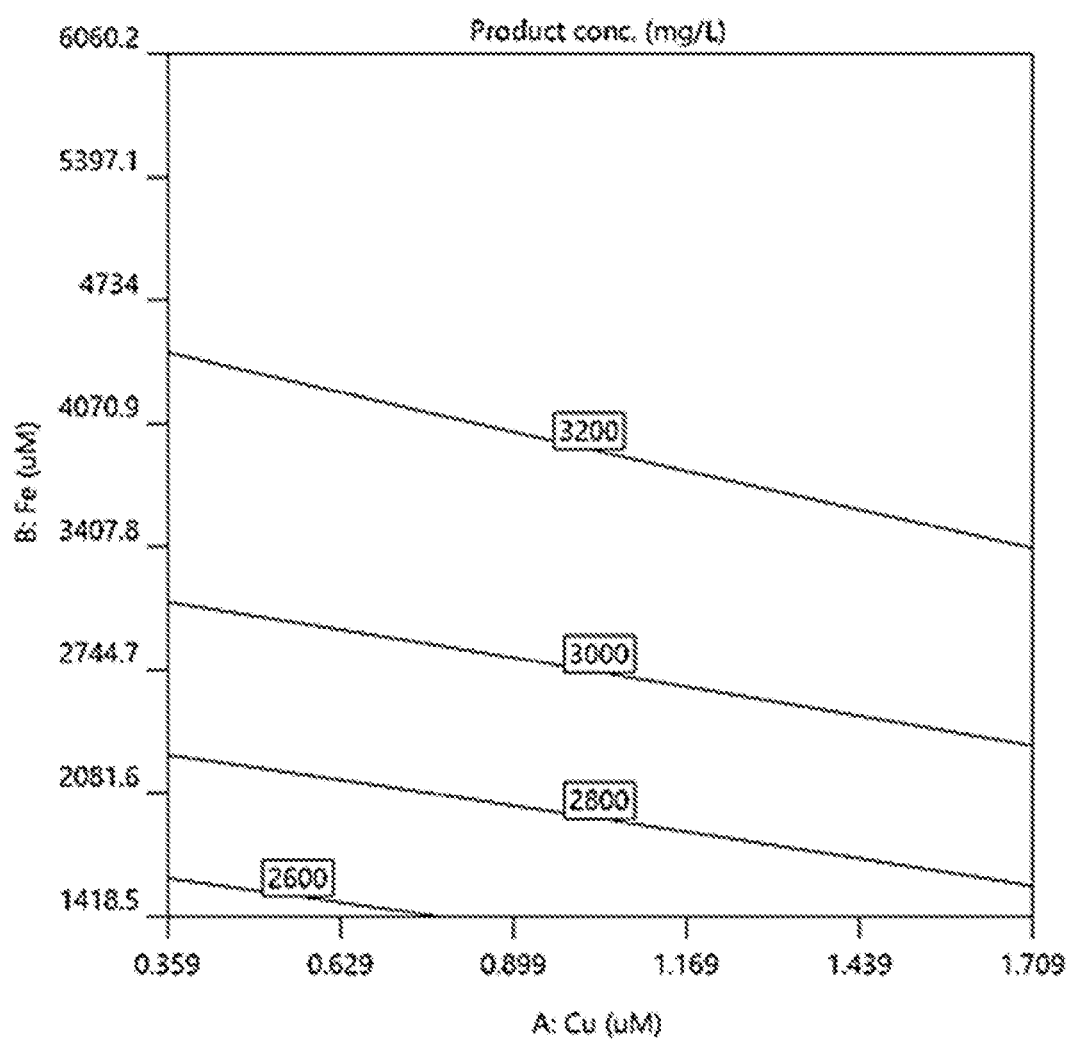
Figure 1E:
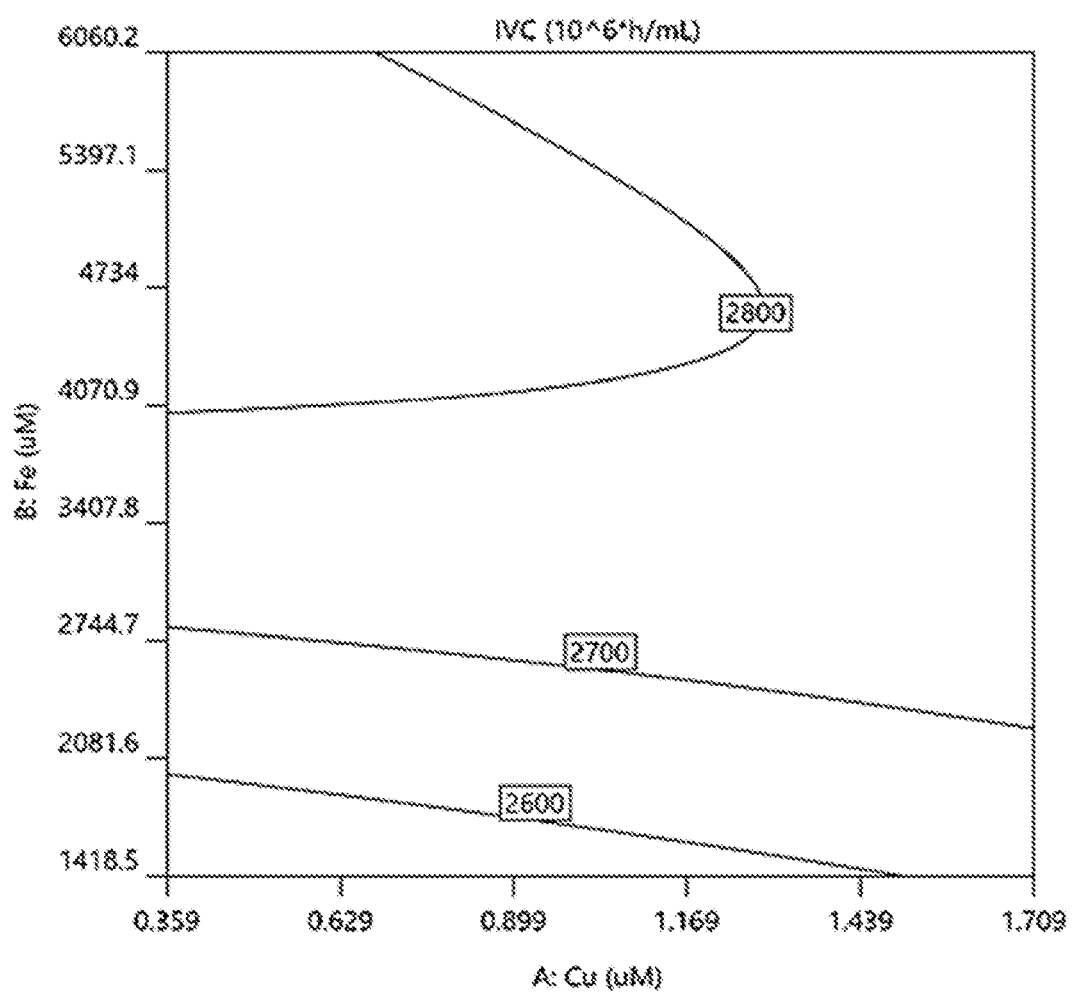

10 Claims, 22 Drawing Sheets
Specification includes a Sequence Listing.

(56) References Cited

OTHER PUBLICATIONS

PCT International Search Report and Written Opinion for PCT/EP2022/061675 mailed Sep. 2, 2022, 21 pages.
Poiron, C et al., "IMGT/mAb-DB ID 860", IMBT/mAb-DB, 2021, pp. 1-2, retrieved from the internet at http://imgt.prg/mAb-DB/mAbcard?Abld=860.
Rathore, Anurag et al., "Impact of Media Components on CQAs of Monoclonal Antibodies", BioPharm International, 2017, pp. 1-7.
Ritacco, Frank V., "Cell Culture Media for Recombinant Protein Expression in Chinese Hamster Ovary (CHO) Cells: History, Key Components, and Optimization Strategies", Biotechnol. Prog., 2018, vol. 34, No. 6, pp. 1407-1426.
Eon-Duval, Alex et al., "Application of the quality by design approach to the drug substance manufacturing process of an Fc fusion protein: Towards a global multi-step design space", Journal of Pharmaceutical Sciences, 2012, vol. 101, No. 10, pp. 3604-3618.

* cited by examiner

METHOD FOR PRODUCING SPESOLIMAB

CROSS-REFERENCE TO RELATED APPLICATION

This application claims priority from European Application No. EP 21171881.2, filed May 3, 2021, the entire contents of which are incorporated by reference herein for all purposes.

SEQUENCE LISTING

This application contains a Sequence Listing in computer readable form entitled "2022-04-21_01251-0010-00US_Seq_List_ST25.bd" created Apr. 21, 2022, having a size of 8 KB, which is incorporated by reference herein.

FIELD OF INVENTION

The present invention relates to a method for producing the anti-IL36R antibody spesolimab. More specifically, the present invention relates to a method of producing spesolimab with a serum-free cell culture medium in a fed-batch culture in the presence of reduced copper and increased iron concentrations. In addition, the present invention relates to a composition comprising low levels of basic species of spesolimab and/or low levels of spesolimab species with high mannose structures.

BACKGROUND

Recombinant monoclonal antibodies (mAb) are commonly expressed in mammalian cell culture. The harvested antibody contains product variants differing in properties such as charge and size, also referred to as product heterogeneity. The major sources of heterogeneity are post-translational modifications and degradation occurring during cell culture. Antibodies are typically purified by several steps of filtration and chromatography. However, it is not practical to remove all heterogeneity through down-stream processing. Therefore, modifications and degradations that occur during the cell culture steps have the most significant impact on the final product quality. Heterogeneity due to post-translational modifications may have an impact on product quality, safety and efficacy of monoclonal antibodies. The major quality attributes comprise glycosylation, charge variants (basic and acidic species, such as oxidated, deamidated and C- and N-terminal modified species), aggregates and low molecular-weight species (LMVV). Upstream processes have a strong influence on product characteristics of an antibody including post-translational modifications and other modifications and these may vary between individual antibodies and cell lines. The most widely used cell line for biopharmaceutical production was originally derived from the Chinese hamster ovary (CHO cell) and at present most recombinant monoclonal antibodies are produced in fed-batch culture.

The anti-IL-36 receptor (IL-36R) antibody spesolimab reduces or blocks IL-36 ligand-mediated signaling and is useful in treating diseases or conditions associate with such signaling.

Interleukin 36 (IL-36) is a group of cytokines in the IL-1 family with pro-inflammatory effect. There are four members of the IL-36 family, IL-36a (IL-1F6), IL-368 (IL-1F8), IL-36y (IL-1F9) and IL-36Ra (IL-1F5), which all bind to IL-36R (previously referred to as IL-1Rrp2) forming a heterodimer with IL-1RAcP. IL-36R ligands are involved in a number of disease conditions and the anti-IL-36R antibody spesolimab is effective in the treatment of inflammatory diseases and autoimmune diseases, such as inflammatory bowel disease (IBD), Crohn's disease (CD), ulcerative colitis (UD), atopic dermatitis (AtD), palmoplantar pustulosis (PPP) and generalized pustular psoriasis (GPP).

Upstream processes and parameters have a strong influence on product characteristics of an antibody, which include cell culture media and process steps, such as temperature and seeding density. Cell culture media have to fulfill the complex nutritional requirements of mammalian cells cultivated in suspension in technical systems in contrast to their natural origin.

Cell culture media consist mostly of an energy source such as carbohydrates or amino acids, lipids, vitamins, trace elements, salts, growth factors, polyamines and non-nutritional components such as buffer, surfactants or antifoam agents. Media used in fed-batch cultivations can be divided into two subgroups: Process media (P-media) or basal media and feed media (F-media). Basal media contain all essential components in initial concentration and are used for inoculation. Feed media provide mostly nutrients in high concentrations during the cultivation process. Thus, cell culture media are complex compositions of many different compounds and it is a challenge to identify compounds which lead to improved growth, productivity or product quality. Trace metals facilitate a diverse range of intra- and extracellular functions in CHO cell culture necessary for optimal mAb productivity and quality, including lactate consumption, energy metabolism, productivity and product quality. Commonly used trace metals in cell culture media are iron, copper, zinc and manganese, which have traditionally been added with fetal calf serum and lot-to-lot variability led to variable results. In chemically defined media, trace elements and nutrients are supplied at defined concentrations and any deficiency or overabundance of trace metals may affect cell culture performance such as cell growth or viability as well as productivity and product quality. For example, zinc deficiency has long been known to induce early death of mammalian cells. Magnesium and calcium deficiency has shown to induce apoptosis in CHO cells and copper deficiency has been shown to affect lactate metabolism in CHO cells (Graham R. J., Bhatia H., Yoon S., Biotechnology and Bioengineering, 2019, 116: 3446-3456). It has further been reported that excess copper exhibited an increase in mAb productivity, but also in increase in basic charge variant. Thus, remains to be a need to further improve culture conditions to improve product quality without grossly affecting yield.

SUMMARY OF THE INVENTION

In the present inventions, we provide a method that allows for an efficient and effective production process for the antibody spesolimab that results in an antibody with certain product characteristics, such as low basic species and low level of species with mannose 5 structure.

Thus, the present invention provides a method for producing the antibody spesolimab in cell culture comprising (a) cultivating CHO cells comprising a nucleic acid encoding the antibody spesolimab in a serum-free cell culture medium using fed-batch culture, comprising (i) seeding the cells in a culture medium, and (ii) culturing the cells in a culture medium under conditions that allow production of the antibody spesolimab in the cell culture comprising feeding the cells in the cell culture with a feed medium, wherein $Cu^{2+}$ is added at 0.35-1.2 µM and iron at 1500 µM or more to the culture medium prior to seeding the cells in step (i) and/or within 2 days after seeding; (b) harvesting the cell culture supernatant comprising the antibody spesolimab; and (c) optionally purifying the antibody spesolimab from the cell culture supernatant. Preferably, the $Cu^{2+}$ and the iron are added to the culture medium prior to seeding in step (i) and/or within 1 day after seeding. In one embodiment the $Cu^{2+}$ and/or the iron are added to the culture medium as one or more bolus additions or continuously. The one or more bolus addition includes providing the $Cu^{2+}$ and/or the iron with the basal medium. In certain embodiments the nucleic acid encoding the antibody spesolimab is stably integrated into the CHO genome. The method comprises feeding the cells with feed medium. In certain embodiments the feed medium is added starting from day 0 to day 3 of the culture, preferably starting from day 1 to day 3, more preferably from day 1 to day 2, even more preferably on day 1. In the method of the invention an increased iron concentration and/or a decreased copper concentration in the culture medium results in the production of the antibody spesolimab having reduced % basic peak group (BPG). In certain preferred embodiments, the antibody spesolimab produced by the method according to the invention has 7.5% BPG.

The methods may further comprise adapting the seeding density. In certain embodiments the seeding density in step (a) is $0.7 \times 10^6$ cells/ml, preferably $0.7 \times 10^6$ cells/ml to $1.5 \times 10^6$ cells/ml, more preferably $0.8 \times 10^6$ cells/ml to $1.5 \times 10^6$ cells/ml, even more preferably $0.9 \times 10^6$ cells/ml to $1.3 \times 10^6$ cells/ml. An increased seeding density results in the production of the antibody spesolimab having reduced % BPG and/or % Man5 structures. The method may further comprise adapting the culture temperature and/or dissolved oxygen concentration, wherein an increased culture temperature and/or reduced dissolved oxygen (DO) results in the production of the antibody spesolimab having reduced % BPG and/or % Man5 structures. In certain embodiments the cells are cultured at 36.0° C. to 37.5° C. under conditions that allow production of the antibody spesolimab comprising feeding the cells with a feed medium, and/or wherein the dissolved oxygen concentration in said culture is maintained within a range of 30-60%. In certain embodiments the antibody spesolimab has less than 5% Man5 structures, preferably less than 4% Man5 structures, more preferably less than 3% Man5 structures, and/or ≤7.5% BPG, preferably ≤7% BPG, more preferably ≤6.5% BPG, even more preferably ≤6% BPG ≤7% BPG, preferably ≤6% BPG.

While any CHO cell may be used in the methods according to the invention, exemplary CHO cell are CHO-K1 and CHO-DG44 cells.

In another aspect a method for producing the antibody spesolimab in cell culture is provided comprising (a) cultivating CHO cells comprising a nucleic acid encoding the antibody spesolimab in a serum-free cell culture medium using fed-batch culture, comprising (i) seeding the cells in a culture medium at a cell density of $≥0.7 \times 10^6$ cells/ml, and (ii) culturing the cells in a culture medium under conditions that allow production of the antibody spesolimab in the cell culture comprising feeding the cells in the cell culture with a feed medium, wherein optionally $Cu^{2+}$ is added at 0.35-1.2 µM and iron at 1500 µM or more to the culture medium prior to seeding the cells in step (i) and/or within 2 days after seeding; (b) harvesting the cell culture supernatant comprising the antibody spesolimab; and (c) optionally purifying the antibody spesolimab from the cell culture supernatant.

The invention further relates to a composition comprising the antibody spesolimab having (a) ≤7.5% BPG, preferably ≤7% BPG, more preferably ≤6.5% BPG, even more preferably ≤6% BPG; and/or (b) less than 5% Man5 structures, preferably less than 4% Man5 structures, more preferably less than 3% Man5 structures; and/or (c) less than 3% lysine glycated variants of the heavy chain (HC) and/or lysines K38 (HC) and K67 (HC) are not glycated and glycation at K23 (HC) is less than 0.3%.

The invention further relates to a composition comprising the antibody spesolimab, wherein the antibody spesolimab is obtained by the method according to the invention.

The composition comprising the antibody spesolimab may be a harvest cell culture fluid (HCCF), an affinity capture pool, a drug substance or a drug product, preferably a drug substance or a drug product. Preferably the composition is a drug product comprising the antibody spesolimab having less than 7.5% BPG and/or less than 5% Man5 structures. In certain embodiment the antibody spesolimab in the composition comprises ≤6% lysine glycated variants of the heavy chain (HC) and/or lysines K38 (HC) and K67 (HC) are not glycated and glycation at K23 (HC) is ≤0.3%.

The invention further provides a composition comprising the antibody spesolimab having 3% lysine glycated variants in the heavy chain (HC) and/or wherein lysines K38 (HC) and K67 (HC) are not glycated and glycation at K23 (HC) is ≤0.3%.

FIGURES

FIGS. 1A-1F shows the effects of varying Fe concentrations (µM) and varying $Cu^{2+}$ concentrations (µM) on the product quality as described in the Examples in a DoE approach. (FIG. 1A) Shows the effect of varying iron and copper concentrations on BPG (%) as measured by strong cation exchange chromatography HPLC (HP-SCX) for $Cu^{2+}$ and for iron as a contour plot. (FIG. 1B) Shows the effect of varying copper concentrations on BPG (%) as measured by strong cation exchange chromatography HPLC (HP-SCX) as a one factor plot. (FIG. 10) Shows the effect of varying iron concentrations on BPG (%) as measured by strong cation exchange chromatography HPLC (HP-SCX) as a one factor plot. The dotted lines in the one factor plots represent the 95% confidence interval. Further shown is the effect of varying iron and copper concentrations on (FIG. 1D) product concentration (mg/L), (FIG. 1E) IVC (1e6 cells *h/mL), and (FIG. 1F) viability (%) as a contour plot.

FIGS. 2A-2H shows the effects of varying seeding densities (1e6 cells/ml, Factor 1) culture temperatures (° C., Factor 2), dissolved oxygen (DO %, Factor 3) and feeding rate (mL/L/day, Factor 4) on the product quality as described in the Examples in a DoE (Design of Experiment) approach. (FIG. 2A) Shown is the effect of varying culture temperatures and seeding densities on BPG (%) as measured by strong cation exchange chromatography HPLC (HP-SCX) as a contour plot. (FIG. 2B) Shown is the effect of varying seeding densities on BPG (%) as measured by strong cation exchange chromatography HPLC (HP-SCX) as a one factor plot. (FIG. 2C) Shown is the effect of varying culture temperature on BPG (%) as measured by strong cation exchange chromatography HPLC (HP-SCX) as a one factor plot. (FIG. 2D) Shown is the effect of varying seeding cell density as a one factor plot on Man5 structures (Oligo Map Peak 3 (%)). (FIG. 2E) Shown is the effect of varying culture temperature as a one factor plot on Man5 structures (Oligo Map Peak 3 (%)). The dotted lines in the one factor plots represent the 95% confidence interval. Further shown is the effect of varying temperatures and seeding densities on (FIG. 2F) product concentration (titer, mg/L), (FIG. 2G) IVC (1e6 cells *h/mL), and (FIG. 2H) viability (%) as a contour plot.

FIGS. 3A-3D shows the effect of varying seeding densities (1e6 cells/ml, Factor 1) culture temperatures (° C., Factor 2), dissolved oxygen (DO %, Factor 3) and feeding rate (ml/L/day, Factor 4) as described in the Examples in a DoE approach. (FIG. 3A) Shown is the effect of varying DO concentrations in a one factor plot on BPG (%) as measured by strong cation exchange chromatography HPLC (HP-SCX). (FIG. 3B) Shown is the effect of varying DO concentrations in a one factor plot on Man5 structures (Oligo Map Peak 3 (%)). (FIG. 3C) Shown is the effect of varying DO concentrations in a one factor plot on product concentration (titer, mg/L). (FIG. 3D) Shown is the effect of varying DO concentrations in a one factor plot on IVC (1e6 cells*h/mL). The dotted lines in the one factor plots represent the 95% confidence interval.

Figure 4A:
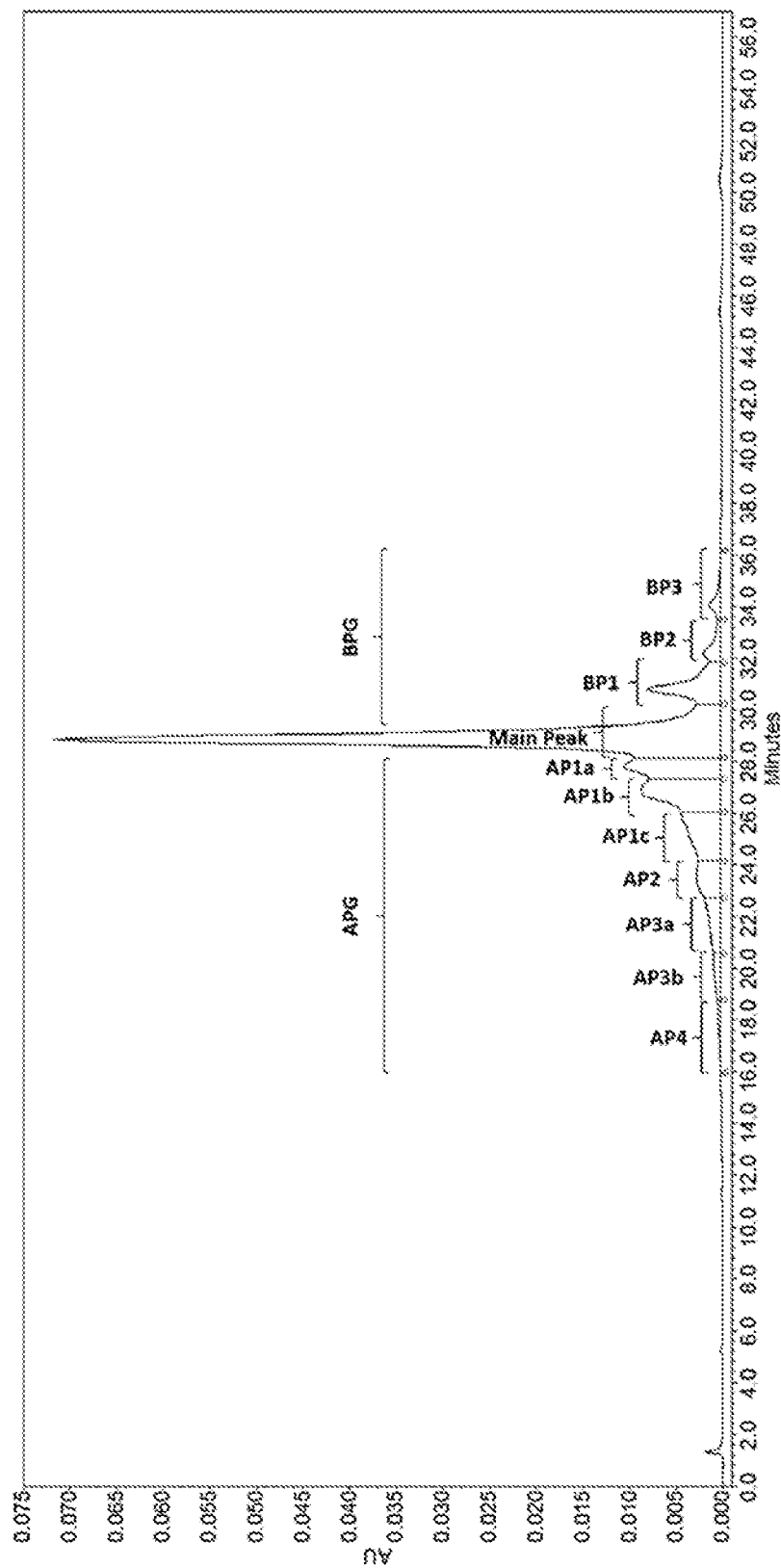
Figure 4B:
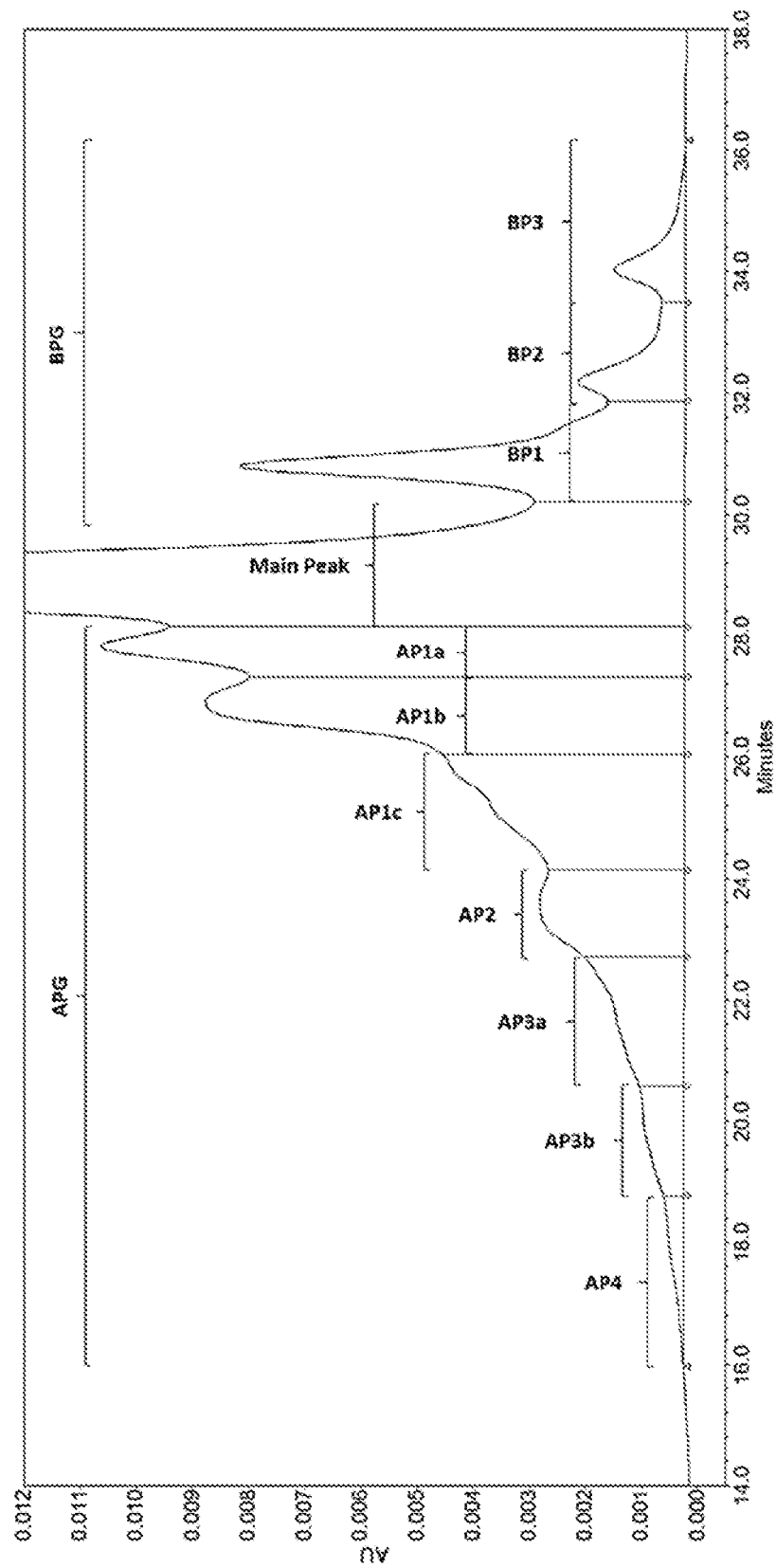
Figure 4C:
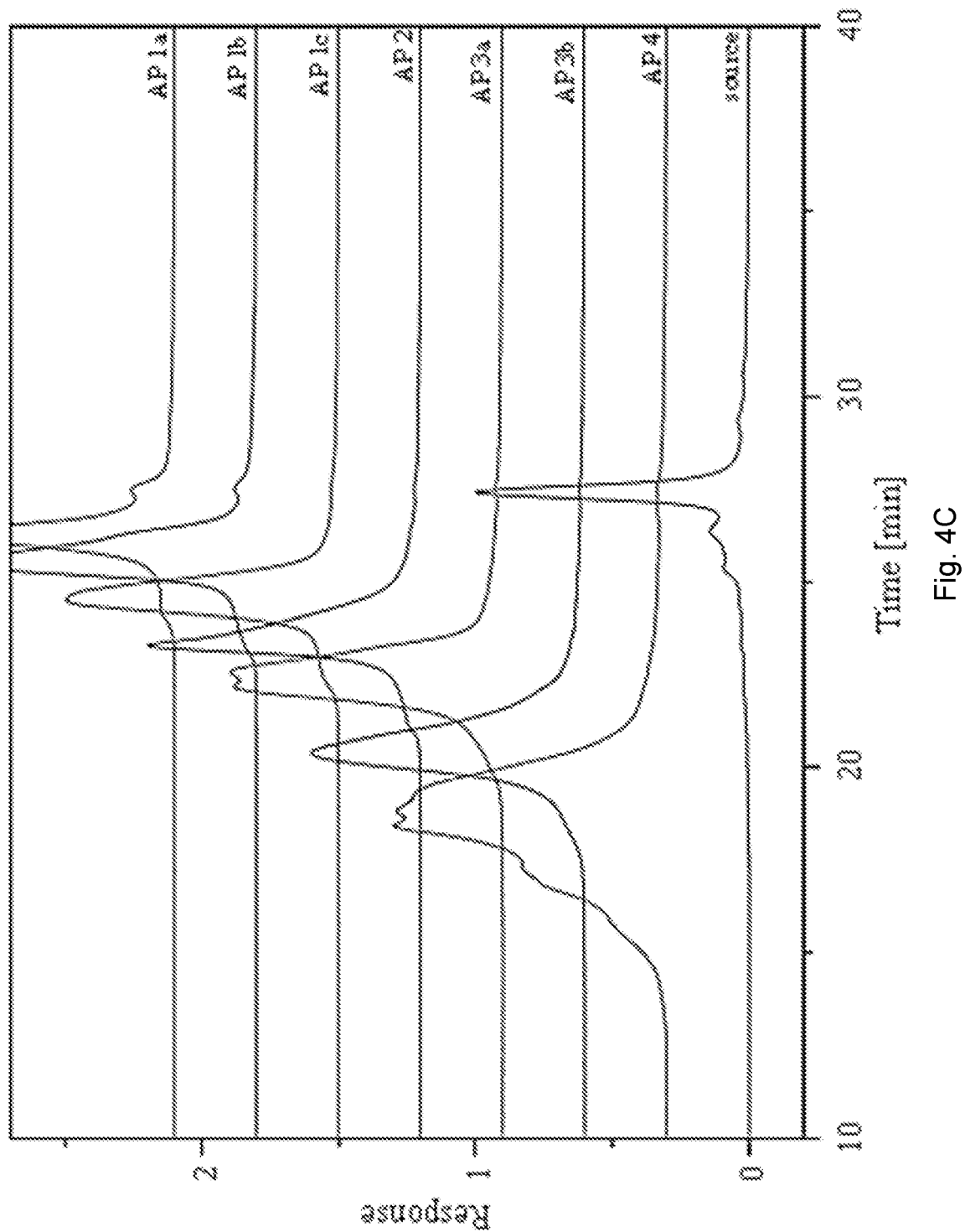

FIGS. 4A-4C shows spesolimab heterogeneity profile using cation exchange chromatography (CEX). (FIG. 4A) Shown is a cation exchange chromatography (CEX) chromatographic profile with annotations of acidic and basic peaks. (FIG. 4B) Shown is the same cation exchange chromatography (CEX) chromatographic profile as in (FIG. 4A) at enlarged scale. (FIG. 4C) Show are CEX chromatograms collected from the different single acidic peak fractions as an overlay.

Figure 5:
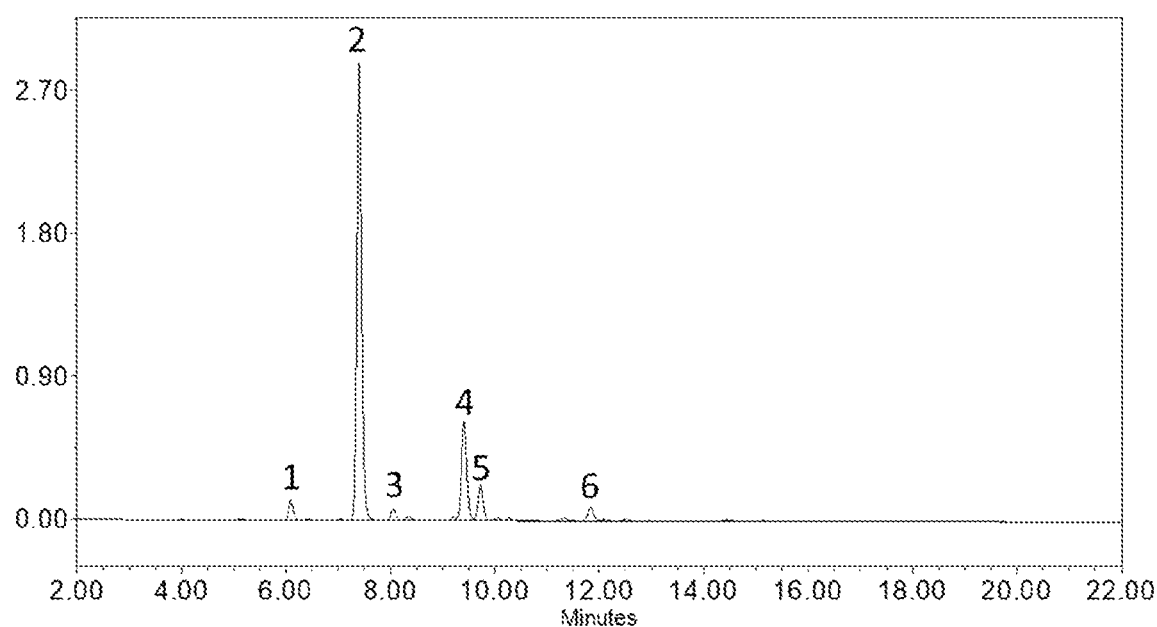

FIG. 5 shows representative oligosaccharide pattern of Spesolimab using HILIC-UHPLC with fluorescent detection. Shown are the main oligo map peaks labeled with Peaks 1-6; Peak 1=A1FG0 (Asialylated-agalactosylated core-fucosylated monoantennary), Peak 2=A2FG0 (Asialylated-agalactosylated core-fucosylated biantennary), Peak 3=Man5 Pentamannose core, Peak 4=A2FG1 (Asialylated-monogalactosylated core-fucosylated biantennary), Peak 5=A2FG1 (Asialylated-monogalactosylated core-fucosylated biantennary), Peak 6)=A2FG2 (Asialylated-digalactosylated core-fucosylated biantennary). The x-axis shows the integration range for the chromatograms in minutes and the y-axis shows fluorescence as voltage signal.

DETAILED DESCRIPTION

The general embodiments "comprising" or "comprised" encompass the more specific embodiment "consisting of". Furthermore, singular and plural forms are not used in a limiting way.

The term "cell culture medium" or "culture medium" as used herein is a medium to culture mammalian cells comprising a minimum of essential nutrients and components such as vitamins, trace elements, salts, bulk salts, amino acids, lipids, carbohydrates in a preferably buffered medium. Typically, a cell culture medium for mammalian cells has an about neutral pH, such as a pH of about 6.5 to about 7.5, preferably about 6.8 to about 7.3, more preferably about 7. Non limiting examples for such cell culture media include commercially available media like Ham's F12 (Sigma, Deisenhofen, Germany), RPMI-1640 (Sigma), Dulbecco's Modified Eagle's Medium (DMEM; Sigma), Minimal Essential Medium (MEM; Sigma), Iscove's Modified Dulbecco's Medium (IMDM; Sigma), CD-CHO (Invitrogen, Carlsbad, CA), CHO-S-Invitrogen), serum-free CHO Medium (Sigma), and protein-free CHO Medium (Sigma) etc. as well as proprietary media from various sources, such as disclosed in WO 2016/156476, the entire content of which is hereby incorporated herein by reference. The cell culture medium may be a basal cell culture medium. The cell culture medium may also be a basal cell culture medium to which the feed medium and/or additives have been added. The cell culture medium may also be referred to as fermentation broth, if the cells are cultured in a fermenter or a bioreactor.

The term "cell cultivation" or "cell culture" includes cell cultivation and fermentation processes in all scales (e.g. from micro titer plates to large-scale industrial bioreactors, i.e. from sub mL-scale to >10.000 L scale), in all different process modes (e.g. batch, fed-batch, perfusion, continuous cultivation), in all process control modes (e.g. non-controlled, fully automated and controlled systems with control of e.g. pH, temperature, oxygen content), in all kind of fermentation systems (e.g. single-use systems, stainless steel systems, glass ware systems). According to the invention the cell culture is a mammalian cell culture and is a fed-batch culture. In a preferred embodiment the cell culture is a cell culture in a volume of >10 L, >1.000 L, >5000 L and more preferably >10.000 L.

The term "fed-batch" as used herein relates to a cell culture in which the cells are fed continuously or periodically with a feed medium containing nutrients. The feeding may start shortly after starting the cell culture on day 0 or more typically one, two or three days after starting the culture. Feeding may follow a preset schedule, such as every day, every two days, every three days etc. Alternatively, the culture may be monitored for cell growth, nutrients or toxic by-products and feeding may be adjusted accordingly. In general, the following parameters are often determined on a daily basis and cover the viable cell concentration, product concentration (titer) and several metabolites such as glucose, pH, lactate, osmolarity (a measure for salt content), and ammonium (growth inhibitor that negatively affects the growth rate and reduces viable biomass). Compared to batch cultures (cultures without feeding), higher product titers can be achieved in the fed-batch mode. Typically, a fed-batch culture is stopped at some point and the cells and/or the medium is harvested and the product of interest, such as the antibody spesolimab, is isolated and/or purified. A fed-batch process is typically maintained about 2-3 weeks, e.g., about 10-24 days, about 12 to 21 days, about 12 to 18 days, preferably about 12 to 16 days.

The term "basal medium" or "basal cell culture medium" as used herein is a cell culture medium to culture mammalian cells as defined below. It refers to the medium in which the cells are cultured from the start of a cell culture run and is not used as an additive to another medium, although various components may be added to the medium. The basal medium serves as the base to which optionally further additives (or supplements) and/or a feed medium may be added during cultivation, i.e., a cell culture run resulting in a cell culture medium. The basal cell culture medium is provided from the beginning of a cell cultivation process. In general, the basal cell culture medium provides nutrients such as carbon sources, amino acids, vitamins, bulk salts (e.g. sodium chloride or potassium chloride), various trace elements (e.g. iron, copper, zinc and manganese), pH buffer, lipids and glucose. Major bulk salts are usually provided only in the basal medium and must not exceed a final osmolarity in the cell culture of about 280-350 mOsmo/kg, so that the cell culture is able to grow and proliferate at a reasonable osmotic stress.

The term "feed" or "feed medium" as used herein relates to a concentrate of nutrients/a concentrated nutrient composition used as a feed in a culture of mammalian cells. It is provided as a "concentrated feed medium" to minimize dilution of the cell culture, typically a feed medium is provided at 10-50 ml/L/day, preferably at 15-45 ml/L/day, more preferably at 20-35 ml/L/day based on the culture starting volume (CSV, meaning the start volume on day 0) in the vessel. This corresponds to a daily addition of about 1-5%, preferably about 1.5-4.5%, more preferably about 2-3% of the culture starting volume. For cultures using high density seeding or ultra-high density seeding higher feeding rates may be beneficial such as 10-50 ml/L/day, 15-45 ml/L/day or 25-45 ml/L/day. This corresponds to a daily addition of about 1-5%, about 1.5-4.5%, or about 2.5-4.5% of the culture starting volume. The feeding rate is to be understood as an average feeding rate over the feeding period. A feed medium typically has higher concentrations of most, but not all, components of the basal cell culture medium. Generally, the feed medium substitutes nutrients that are consumed during cell culture, such as amino acids and carbohydrates, while salts and buffers are of less importance and are commonly provided with the basal medium. Also trace elements are typically provided mainly with the basal medium and may be present in the feed medium. The feed medium is typically added to the (basal) cell culture medium/fermentation broth in fed-batch mode. The feed medium added (repeatedly or continuously) to the basal medium results in the cell culture medium. The feed may be added in different modes like continuous or bolus addition or via perfusion related techniques (chemostat or hybrid-perfused system). Preferably, the feed medium is added daily, but may also be added more frequently, such as twice daily or less frequently, such as every second day. More preferably the feed medium is added continuously. The addition of nutrients is commonly performed during cultivation (i.e., after day 0). In contrast to the basal medium, the feed medium typically consists of a highly concentrated nutrient solution (e.g. >6×) that provides all the components similar to the basal medium except for 'high-osmolarity-active compounds' such as major bulk salts (e.g., NaCl, KCl, $NaHCO_3$, $MgSO_4$, $Ca(NO_3)_2$). Typically a 6×-fold concentrate or higher of the basal medium without or with reduced bulk salts maintains good solubility of compounds and sufficiently low osmolarity (e.g. 270-1500 mOsmo/kg, preferably 310-800 mOsmo/kg) in order to maintain osmolarity in the cell culture at about 270-550 mOsmo/kg, preferably at about 280-450 mOsmo/kg, more preferably at about 280-350 mOsmo/kg. The feed medium may be added as one complete feed medium or may comprise one or more feed supplements for separate addition to the cell culture. The use of one or more feed supplements may be necessary due to different feeding schedules, such as regular feeding and feeding on demand as often performed for glucose addition, which is therefore typically at least also provided as a separate feed. The use of one or more feed supplements may also be necessary due to low solubility of certain compounds, solubility at different pH of certain compounds and/or interactions of compounds in the feed medium at high concentrations.

The term "feed supplement" as used herein relates to a concentrate of a nutrient, which might be added to the feed medium before use or may be added separately from the feed medium to the basal medium and/or the cell culture medium. Thus, a compound may be provided with the feed medium or the feed supplement or a compound may be provided with the feed medium and the feed supplement. For example, cysteine may be added in a two-feed strategy with the feed medium and the feed supplement. As the feed medium, the "feed supplement" is provided as a concentrate in order to avoid dilution of the cell culture.

The cell culture medium, both basal medium and/or feed medium are preferably serum-free, chemically defined or chemically defined and protein-free. A "serum-free medium" as used herein refers to a cell culture medium for in vitro cell culture, which does not contain serum from animal origin. This is preferred as serum may contain contaminants from said animal, such as viruses, and because serum is ill-defined and varies from batch to batch. The basal medium and the feed medium according to the invention are serum-free.

The term "chemically defined medium" as used herein refers to a cell culture medium suitable for in vitro cell culture, in which all components are known. More specifically it does not comprise any supplements such as animal serum or plant, yeast or animal hydrolysates. It may comprise hydrolysates only if all components have been analysed and the exact composition thereof is known and can be reproducibly prepared. The basal medium and the feed medium according to the invention are preferably chemically defined. The chemically defined medium may further comprise recombinant proteins, such as recombinant growth factors, particularly insulin or insulin-like growth factor (IGF).

A "protein-free medium" as used herein refers to a cell culture medium for in vitro cell culture comprising no proteins, except for proteins produced by the cell to be cultured, wherein protein refers to polypeptides of any length, but excludes single amino acids, dipeptides or tripeptides. Specifically, growth factors such as insulin and insulin-like growth factor (IGF) are not present in the medium. Preferably, the basal medium and feed medium according to the present invention are chemically defined and protein-free.

As used herein, the term "medium platform", or "media platform" consists of a basal cell culture medium, which is provided from the beginning of a cell cultivation process and a feed medium, which is added to the basal cell culture medium during cultivation. Optionally further additives, such as glucose, may be added during the cell cultivation process. The feed medium may be supplied in any kind of fed batch process mode (e.g. continuous, with changing feed rates or as bolus feed additions).

The terms "vitality" and "viability" are synonymously used and refers to the % viable cells in a cell culture as determined by methods known in the art, e.g., trypan blue exclusion with a Cedex device based on an automated-microscopic cell count (Roche Diagnostics, Mannheim). However, there exist of number of other methods for the determination of the viability such as fluorometric (such as based on propidium iodide), calorimetric or enzymatic methods that are used to reflect the energy metabolism of a living cell e.g. methods that use LDH lactate-dehydrogenase or certain tetrazolium salts such as alamar blue, MTT (3-(4,5-dimethylthiazol yl-2,5-diphenyltetrazolium bromide) or TTC (tetrazolium chloride).

The terms "polypeptide" or "protein" or "product" or "product protein" or "amino acid residue sequence" are used interchangeably. These terms refer to polymers of amino acids of any length, preferably to a monoclonal antibody in the context of the present invention, even more preferably to the monoclonal antibody spesolimab. These terms also include proteins or antibodies that are post-translationally modified through reactions that include, but are not limited to glycosylation, glycation, acetylation, phosphorylation, oxidation, amidation or protein processing.

The term "encodes" and "codes for" as used herein refers broadly to any process whereby the information in a polymeric macromolecule is used to direct the production of a second molecule that is different from the first. The second molecule may have a chemical structure that is different from the chemical nature of the first molecule. For example, in some aspects, the term "encode" describes the process of semi-conservative DNA replication, where one strand of a double-stranded DNA molecule is used as a template to encode a newly synthesized complementary sister strand by a DNA-dependent DNA polymerase. In other aspects, a DNA molecule can encode an RNA molecule (e.g., by the process of transcription that uses a DNA-dependent RNA polymerase enzyme). Also, an RNA molecule can encode a polypeptide, as in the process of translation. When used to describe the process of translation, the term "encode" also extends to the triplet codon that encodes an amino acid. In some aspects, an RNA molecule can encode a DNA molecule, e.g., by the process of reverse transcription incorporating an RNA-dependent DNA polymerase. In another aspect, a DNA molecule can encode a polypeptide, where it is understood that "encode" as used in that case incorporates both the processes of transcription and translation. In the context of the present invention the term "nucleic acid encoding the antibody spesolimab" refers to a DNA molecule or sequence coding for a polypeptide having the amino acid sequence of the antibody spesolimab, i.e., the heavy chain and the light chain. Preferably the nucleic acid encoding the antibody spesolimab is stably integrated into the genome of the CHO cell.

The term "spesolimab" as used herein refers to a humanized monoclonal IgG1 anti-IL-36R antibody having the INN name spesolimab, also registered under the CAS Registry Number 2097104-58-8. Spesolimab has the following heavy chain and light chain amino acid sequences:

```
Heavy chain (HC) amino acid sequence:
                                          (SEQ ID NO: 1)
QVQLVQSGAEVKKPGASVKVSCKASGYSFTSSWIHWVKQAPGQGLEWMG

EINPGNVRTNYNENFRNKVTMTVDTSISTAYMELSRLRSDDTAVYYCTV

VFYGEPYFPYWGQGTLVTVSSASTKGPSVFPLAPSSKSTSGGTAALGCL

VKDYFPEPVTVSWNSGALTSGVHTFPAVLQSSGLYSLSSVVTVPSSSLG

TQTYICNVNHKPSNTKVDKRVEPKSCDKTHTCPPCPAPEAAGGPSVFLF

PPKPKDTLMISRTPEVTCVVVDVSHEDPEVKFNWYVDGVEVHNAKTKPR

EEQYNSTYRVVSVLTVLHQDWLNGKEYKCKVSNKALPAPIEKTISKAKG

QPREPQVYTLPPSREEMTKNQVSLTCLVKGFYPSDIAVEWESNGQPENN

YKTTPPVLDSDGSFFLYSKLTVDKSRWQQGNVFSCSVMHEALHNHYTQK

SLSLSPGK

Light chain (LC) amino acid sequence:
                                          (SEQ ID NO: 2)
QIVLTQSPGTLSLSPGERATMTCTASSSVSSSYFHWYQQKPGQAPRLWI

YRTSRLASGVPDRFSGSGSGTDFTLTISRLEPEDAATYYCHQFHRSPLT

FGAGTKLEIKRTVAAPSVFIFPPSDEQLKSGTASVVCLLNNFYPREAKV

QWKVDNALQSGNSQESVTEQDSKDSTYSLSSTLTLSKADYEKHKVYACE

VTHQGLSSPVTKSFNRGEC

Variable heavy chain (VH) amino acid sequence:
                                          (SEQ ID NO: 3)
QVQLVQSGAEVKKPGASVKVSCKASGYSFTSSWIHWVKQAPGQGLEWMG

EINPGNVRTNYNENFRNKVTMTVDTSISTAYMELSRLRSDDTAVYYCTV

VFYGEPYFPYWGQGTLVTVSS

Variable light chain (LC) amino acid sequence:
                                          (SEQ ID NO: 4)
QIVLTQSPGTLSLSPGERATMTCTASSSVSSSYFHWYQQKPGQAPRLWI

YRTSRLASGVPDRFSGSGSGTDFTLTISRLEPEDAATYYCHQFHRSPLT

FGAGTKLEIK
```

The term "the antibody spesolimab" as used herein refers to the antibody spesolimab produced in a CHO cell culture, preferably by the method of the present invention and hence refers to a multitude of antibody molecules with a certain degree of variants heterogeneity. The person skilled in the art will therefore understands that it refers to a mixture of various spesolimab species, such as those comprising various post-translational modifications including glycosylation variants, charge variants and glycation variants or species.

The term "seeding" as used herein refers to collecting a sample of mammalian cells, such as CHO cells, and placing them into a medium that contains the nutrients needed for growth. Typically, the mammalian cells are placed into a basal medium for growth or production. This step may also be referred to as inoculating. The mammalian cells may be inoculated into the basal medium at different seeding densities. As referred to herein the terms "normal seeding" refer to a standard seeding density of about $0.7 \times 10^6$ cells/ml to about $1 \times 10^6$ cells/ml, the term "high seeding" refers to a seeding density of greater $1 \times 10^6$ cells/ml to about $4 \times 10^6$ cells/ml and the term "ultrahigh seeding" refers to a seeding density of greater $4 \times 10^6$ cells/ml to about $20 \times 10^6$ cells/ml or even higher, preferably of about $6 \times 10^6$ cells/ml to about $15 \times 10^6$ cells/ml, more preferably of $8 \times 10^6$ cells/ml to about $12 \times 10^6$ cells/ml. According to the present invention the CHO cells are preferably seeded at $0.7 \times 10^6$ cells/ml. In certain embodiments the CHO cells are seeded at $0.7 \times 10^6$ cells/ml to about $2 \times 10^6$ cells/ml, preferably at $0.7 \times 10^6$ cells/ml to about $1.5 \times 10^6$ cells/ml, more preferably at $0.8 \times 10^6$ cells/ml to about $1.5 \times 10^6$ cells/ml, and even more preferably at $0.9 \times 10^6$ cells/ml to about $1.3 \times 10^6$ cells/ml.

Iron is an essential ingredient in mammalian cell culture media (i) as a trace element and (ii) as a transferrin replacement (e.g. iron as iron chelate). Transferrin is typically derived from plasma and may be supplied as a lyophilized powder of human transferrin which is partially iron-saturated. Transferrin is a glycoprotein with homologous N-terminal and C-terminal iron-binding domains and is related to several other iron-binding proteins including lactoferrin, melanotransferrin, and ovotransferrin. Transferrin is commercially available for use in animal cell culture (e.g. by Sigma-Aldrich, CAS number 11096-37-0). There are numerous iron compounds that are used as transferrin replacement in cell culture media. These exist in II/III forms, as various salts, and as hydrated/dehydrated forms. Examples are without being limited thereto iron (III) phosphate, iron (III) pyrophosphate, iron (III) nitrate, iron (II) sulfate, iron (III) chloride, iron (II) lactate, ferric (III) citrate, ammonium ferric (III) citrate, iron-dextran, iron (III) choline citrate or ethylenediaminetetraacetic acid ferric sodium salt. Preferred iron sources are iron pyrophosphate ($Fe_4(P_2O_7)_3$), iron ammonium citrate ($(NH_4)_5[Fe(C_6H_4O_7)_2]$), iron citrate ($C_6H_5FeO_7$), iron choline citrate ($C_{33}H_{57}Fe_2N_3O_{24}$), iron nitrate ($Fe(NO_3)_3$), iron phosphate ($FePO_4$), iron sulfate ($FeSO_4$) and iron chloride ($FeCl_3$).

The term "iron choline citrate" as used herein relates to the chemical compound ferric choline citrate falling under the CAS No. 1336-80-7 that forms an iron choline citrate complex. Common synonyms used are e.g. ferrocholinate citrate, ferric choline citrate, choline citrate, iron (III) choline citrate, choline ferric citrate, tricholine citrate, choline ferric citrate, 2-Hydroxyethyl-trimethyl-ammonium, 2-Hydroxypropane-1,2,3-tricarboxylate. This compound may be added as an iron carrier to both the basal and the feed medium. Iron choline citrate with a molar iron:choline:citrate ratio of 2:3:3 (ferric choline citrate, CAS-Number 1336-80-7, molecular weight Mw=991.5 g/mol+/−49.57 g/mol due to 5% crystal water content, iron complex with iron content of about 10.2-12.4%, molecule ratio for iron:choline:citrate of 2:3:3, molecule formula $C_{33}H_{57}Fe_2N_3O_{24}$), is e.g. obtainable from Dr. Paul Lohmann GmbH KG. However, other suitable iron choline citrate structures may be used at equimolar amounts based on the iron concentration, e.g. iron:choline:citrate at a ratio of 1:1:1, molecular weight of Mw=348.11 g/mol or (iron):choline: citrate at a ratio of (2):3:3, molecular weight of Mw=501.61 g/mol, $C_{21}H_{47}N_3O_{10}$ (sum formula without iron). Iron choline citrate may also be provided as separate components comprising an iron source (such as iron chloride), a choline source (such as choline chloride) and a citrate source (such as sodium citrate) or a choline source and ferric citrate, preferably at a ration as provided with the iron choline citrate described above.

A cell culture medium to culture mammalian cells comprises essential nutrients including amino acids and carbohydrates and components such as vitamins, trace elements, salts, bulk salts and lipids or lipid precursors in a preferably buffered medium. Also, growth factors may be added to the basal cell culture medium or the feed medium, e.g., recombinant insulin-like growth factor (IGF) or recombinant insulin. Thus, in certain embodiments the basal cell culture medium and/or the feed medium are chemically defined and protein-free except for the presence of IGF or recombinant insulin.

The term "amino acid" as used herein refers to the twenty natural amino acids that are encoded by the universal genetic code, typically the L-form (i.e., L-alanine, L-arginine, L-asparagine, L-aspartic acid, L-cysteine, L-glutamic acid, L-glutamine, L-glycine, L-histidine, L-isoleucine, L-leucine, L-lysine, L-methionine, L-phenylalanine, L-proline, L-serine, L-threonine, L-tryptophan, L-tyrosine and L-valine). The amino acids (e.g., glutamine and/or tyrosine) may be provided as dipeptides with increased stability and/or solubility, preferably containing an L-alanine (L-ala-x) or L-glycine extension (L-gly-x), such as glycyl-glutamine and alanyl-glutamine. Further, cysteine may also be provided as L-cystine. The term "amino acids" as used herein encompasses all different salts thereof, such as (without being limited thereto) L-arginine monohydrochloride, L-asparagine monohydrate, L-cysteine hydrochloride monohydrate, L-cystine dihydrochloride, L-histidine monohydrochloride dihydrate, L-lysine monohydrochloride and hydroxyl L-proline, L-tyrosine disodium dehydrate. The exact form of the amino acids is not of importance for this invention, unless characteristics such as solubility, osmolarity, stability, purity are impaired. Typically and preferably, L-arginine is used as L-arginine×HCl, L-asparagine is used as L-asparagine×$H_2O$, L-cysteine is used as L-cysteine×HCl×$H_2O$, L-cystine is used as L-cystine×2 HCl, L-histidine is used as L-histidine×HCl×$H_2O$ and L-tyrosine is used as L-tyrosine×2 Na×2$H_2O$, wherein each preferred amino acid form may be selected independent of the other or together or any combination thereof. Also encompassed are dipeptides comprising one or two of the relevant amino acids. For example, L-glutamine is often added in the form of dipeptides, such as L-alanyl-L-glutamine to the cell culture medium for improved stability and reduced ammonium built up in storage or during long-term culture.

The term "all amino acids in the medium" or "total amino acid content" as use herein refers to the sum of the "amino acids" as defined above in mM. In a dipeptide, each amino acid counts separately, thus 1 mM alanyl-glutamine is counted as 1 mM L-alanine and 1 mM L-glutamine (molar ratio 1:1). Likewise, in L-cystine each cysteine counts separately, thus 1 mM L-cystine is counted as 2 mM L-cysteine (molar ratio 1:2). Typically, the total amino acid content is about 5 to 20-fold, preferably about 7 to 15-fold and more preferably about 10-fold higher in the concentrated feed medium compared to the basal cell culture medium. The total amino acid content of the basal medium according to the invention may be about 25 to 150 mM, preferably about 30 to 130 mM, more preferably about 35 to 120 mM and even more preferably about 40 to 100 mM. The total amino acid content of the feed medium may be about 100 to 1000 mM, preferably about 200 to 900 mM, more preferably about 300 to 800 mM and even more preferably about 400 to 700 mM. Other amino acids that are not directly coded by the universal genetic code, such as L-ornithine, hydroxyl L-proline or metabolites thereof such as taurine may further be present in the basal cell culture medium or the feed medium, but these are not counted for the total amino acid content.

Non-limiting examples for suitable vitamins are biotin (B7), calcium pantothenate, cyanocobalamin (B12), folic acid, myoinositol, niacinamid (B3), pyridoxal hydrochloride, pyridoxine hydrochloride, riboflavin (B2) and/or thiamine (B1). Non-limiting examples for trace elements are molybdenum, vanadium, copper, nickel, selenite, silicate and zinc, exemplary sources of trace elements are ammonium molybdate, ammonium vanadate, cupric sulfate, nickel sulfate, sodium selenite, sodium silicate, and zinc sulfate and/or zinc chloride. Non-limiting examples of lipid precursors are choline chloride, ethanolamine, glycerol, inositol, linoleic acid, fatty acids, phospholipids or cholesterol-related compounds.

Further, salts may be, without being limited thereto, calcium chloride, calcium nitrate, magnesium chloride, magnesium sulfate, potassium chloride and/or sodium chloride. One function of the salt is to adjust the osmolarity in the medium. Preferably the osmolarity of a basal cell culture medium does not go beyond an optimal range of typically between 280-350 mOsmo/kg. Typically, the osmolarity of a concentrated feed medium is <2000 mOsmo/kg, preferably <1500 mOsmo/kg, more preferably <1000 mOsmo/kg. The osmolarity of the feed medium may be higher, but should not increase the osmolarity in the cell culture upon addition beyond the optimal range of 270-550 mOsmo/kg, preferably of 280-450 mOsmo/kg, more preferably of 280-350 mOsmo/kg.

Preferably, the feed medium has reduced or low salt content. A reduced or low salt content means, e.g., a total salt concentration of about 100 mM or less, preferably of about 50 mM or less (e.g. a feed medium without sodium chloride, and a reduced concentration of potassium chloride). The most important contributors to osmolarity are sodium ions, chloride ions, and bicarbonate as well as glucose and other carbon sources e.g. amino acids. Furthermore, for a common fed-batch process the feed medium needs to be concentrated to minimize the culture volume over the cultivation period. The size of the bioreactor may actually cause feeding constrains that allow only total feed dosages of approximately 35% (30-40%) of the culture starting volume or of approximately 45% (40-50%) of the culture starting volume.

Carbohydrates may be, but are not limited to glucose, mannose, galactose, fructose, sucrose or glucosamine etc. These carbohydrates can be added directly to the basal cell culture medium and/or the feed medium or may be added separately to the cell culture. Other energy sources include, but are not limited to sodium pyruvate.

Mammalian cells should be cultured at a neutral pH, such as from about pH 6.5 to about pH 7.5, preferably from about pH 6.6 to about pH 7.3, more preferred at a pH of about 7. Hence buffering agents should be added to the basal cell culture medium. For the feed medium the pH may be slightly outside said range, as long as the addition of the feed medium does not bring the pH of the cell culture outside this range, since the feed medium is added as a concentrate. Preferred ranges for the pH in a feed medium are from about 6 to about 8. Suitable buffering agents include, but are not limiting to HEPES, phosphate buffers (e.g., potassium phosphate monobasic and potassium phosphate dibasic and/or sodium phosphate dibase anhydrate and sodium phosphate monobase), phenol red, sodium bicarbonate and/or sodium hydrogen carbonate.

Generally, the feed medium comprises nutrients that are consumed during cell culture, such as amino acids and carbohydrates, while salts and buffers are of less importance. Some salts may therefore be omitted entirely from a feed medium.

The basal cell culture medium and/or the feed medium should meet the cell specific requirements and metabolic needs of a mammalian cell culture during the time course of cell cultivation. In other words it meets (i) the cell specific needs of a mammalian cell, (ii) in a cell cultivation system, (iii) throughout the lifecycle of a cultivation run (which is about 10-20 days). Mammalian cells in culture have different nutritional requirements in different phases of a cell culture process.

The cell culture may further comprise cell expansion which is needed for the inoculation train in a scale-up procedure. For example, cultivation scales are stepwise increased from thaw of a cell bank (mL scale) to the production scale (>10.000 L scale). The better the growth in each N-x stage is (with N-stage meaning the final production scale and N-x meaning the cell expansion stages before final production stage usually in batch mode), the faster and the better each transfer to the next stage can occur. Specifically, better cell growth and higher viable cell concentrations allow that N-x cultivations can be performed with reduced run times (hence faster). Better cell growth and higher viable cell concentrations also result in improved transfers resulting in an overall improved performance. For example, when a certain N-x stage should be inoculated with a certain seeding cell density and the viable cell concentration is high, a relatively low volume of cell culture needs to be transferred from one stage to the next (transfer of inoculum volume per culture starting volume (CSV) is defined as spit ratio, usually 1:5 to 1:20 is common). This means that at the same time only a reduced volume of "used" cell culture medium is transferred from one stage to the next and a maximal volume of "new" media can be added to the next stage (constant overall cultivation volumes). This also results in improved overall cell culture performance in the final N-stage (e.g. increased product titer).

In most cell cultures a non-ideal nutrient composition for major carbon can be determined due to an overflow-metabolism. This means, that the major carbon source glucose is utilized ineffectively and by this contributes to an increase of organic acids e.g. lactic acid. The increased level of lactic acid can contribute to a pH drop below 6.65 and this would negatively affect the buffer capacity of the culture medium and thus the culture viability. For such reason, the $CO_2$ concentration in the culture atmosphere is reduced at the beginning of the exponential growth phase in order to minimize the acid level in the culture medium.

The antibody spesolimab is purified from other recombinant proteins, host cell proteins and contaminants in a downstream process. The samples obtained and/or analyzed at the various steps of purification are also referred to as in-process control (IPC) samples or process intermediates. The harvest typically includes centrifugation and/or filtration, such as to produce a harvested cell culture fluid. Further process steps may include affinity chromatography, particularly Protein A column chromatography, to separate the antibody spesolimab from contaminants. Further process steps may include acid treatment to inactivate viruses, clarifying the product pool by depth filtration, preferably following acid treatment, to remove cell contaminants, such as HCPs and DNA. Further process steps may include in this order or any other order as may be appropriate in the individual case: ion exchange chromatography, particularly anion exchange chromatography to further remove contaminating cell components and/or cation exchange chromatography to remove product related contaminants, such as aggregates. Further, preferably following process steps may include nanofiltration to further remove viruses and ultrafiltration and diafiltration to concentrate the recombinant protein and to exchange buffer, respectively.

The sample comprising the antibody spesolimab purified from the harvested cell culture fluid (HCCF) following, e.g., protein A column, acid treatment, depth filtration, anion exchange chromatography and/or cation exchange chromatography, may also be referred to as "purified antibody product pool". The purified antibody product pool may be further purified and may but does not need to be formulated with excipients. Thus, the purified antibody product pool can be identical with the drug substance but may also be present at a different concentration and/or in a different buffer system.

The term "harvested cell culture fluid (HCCF)" as used herein refers to the fluid comprising the harvested recombinant protein, in the present case the antibody spesolimab. Typically, the host cells used for production are engineered to secrete the polypeptide into the cell culture medium and hence the cell culture supernatant would be harvested. However, theoretically the cells may also be lysed prior to harvest. The harvest includes centrifugation and/or filtration to produce a harvested cell culture fluid. Thus, the harvested cell culture fluid may also be referred to as clarified harvested cell culture fluid. It does not contain living cells and cell debris and cell components have been removed. Typically, it refers to a clarified cell culture supernatant, wherein clarified means centrifugation or filtration, preferably by filtration, such as with a 0.1 µm filter. The HCCF is in some embodiments a clarified HCCF. In additional or alternative embodiments, the HCCF comprises from about 1.8 g/L to about 5 g/L of the antibody spesolimab, preferably from about 2.0 g/L to about 5.0 g/L of the antibody spesolimab, more preferably from about 2.5 g/L to about 4.5 g/L of the antibody spesolimab. The method according to the present invention is a large-scale purification method for an HCCF comprising >20 kg, or even >30 kg spesolimab and/or for an HCCF from a ≥2,000 L fermenter, preferably a 12,000 L fermenter.

The term "product pool" as used herein refers to the solution comprising the product, i.e., the antibody spesolimab, at the end of a process step. The term "product pool" is therefore used synonymously with the term "product pool comprising the antibody". This can be the eluate or the flow-through or filtrate, as long as it contains the major fraction of the product. The term "product pool sample" therefore refers to a sample of the solution comprising the antibody spesolimab, particularly following one of the method steps according to the methods of the invention.

The antibody spesolimab is produced in a CHO cell line at large scale, i.e., at 12,000 L scale. The titer in the HCCF is from about 1.8 g/L to about 5 g/L. Thus, the process according to the present invention provides the starting material (HCCF) for purification comprising >20 kg, or even >30 kg spesolimab.

The term "contaminating" or "contamination" as used herein refers to the presence of an undesired and/or unintentional substance, such as host cell proteins, host cell DNA and/or at least one protein or substance having a hydrolytic activity.

The term "drug substance (DS)" refers to the formulated active pharmaceutical ingredient (API) with excipients. The API has the therapeutic effect in the body as opposed to the excipients, which assist with the delivery of the API. In the case of biologic therapeutics, the formulated API with excipients typically means the API in the final formulation buffer at a concentration of at least the highest concentration used in the final dosage form, also referred to as drug product.

The term "drug product", abbreviated as DP, as used herein refers to the final marketed dosage form of the drug substance for example a tablet or capsule or in the case of biologics typically the solution for injection in the appropriate containment, such as a vial or syringe. The drug product may also be in a lyophilized form. Spesolimab is provided as an aqueous formulation at 60 mg/ml in a glass vial or at 150 mg/mL in a glass syringe.

Antibodies typically carry oligosaccharides attached to Asn297 (IgG) of the $C_H2$-domain of the immunoglobulin heavy chain. The majority of these oligosaccharides has a biantennary structure. This means they have a core structure (Man($\alpha$1-4)GlcNAc($\beta$-4)GlcNAc→Asn) with an optional Fuc($\alpha$1-6) linkage at the terminal GlcNAc residue and two outer arms (Gal($\beta$-4)GlcNAc($\beta$-2)Man($\alpha$1-6)→Man and Gal(($\beta$-4)GlcNAc($\beta$-2)Man($\alpha$1-3)→Man; terminal galactose (Gal) residues are optional) connected to the terminal mannose of the core structure (Man=mannose, GlcNAc=N-acetyl glucose, Gal=galactose, Fuc=fucose), The terminal galactose in each outer arm is optional, resulting in a G(0), G(1) and G(2) isoform, with the G(2) isoform having a terminal galactose residue on each of the outer-arms of the oligosaccharide structure, the G(1) isoform having only a terminal galactose residue on either of the ($\alpha$1-6) or ($\alpha$1-3) linked outer arm, and the G(0) isoform having no galactose residue on both outer arms.

The term "Man5 structure" or "mannose-5 glycostructure" are used synonymously herein and refer to an oligomannose-structure linked to an Asn residue of a polypeptide comprising or consisting of five mannose residues and two N-acetyl glucose core residues, forming a triantennary structure.

The introduction of glycostructures to polypeptides, such as antibodies, is a post-translational modification. Due to incomplete glycosylation every cell expresses polypeptides, such as antibodies, with a glycosylation pattern or profile comprising different glycostructures. The sum or the individual glycostructures is referred to as glycosylation pattern or profile. The oligosaccharides of the purified spesolimab or the protein A pool may be determined by labelling the released oligosaccharides with 2-amino pyridine and analysis using hydrophilic interaction chromatography (HILIC-HPLC), preferably hydrophilic interaction ultra performance liquid chromatography (HILIC-UPLC). The chromatography profile shows 6 main peaks of which peak 3 is Man5 peak (FIG. 5) also referred to as (Oligo Map Peak 3). The term "% Man5 structures" as used herein refers to the relative % peak area (peak 3) of total sum peak area.

The term "about" as used herein refers to a variation of 10% of the value specified, for example, about 50% carries a variation from 45 to 55%.

The present invention provides a method for producing the antibody spesolimab in cell culture comprising (a) cultivating CHO cells comprising a nucleic acid encoding the antibody spesolimab in a serum-free cell culture medium using fed-batch culture, comprising (i) seeding the cells in a culture medium, and (ii) culturing the cells in a culture medium under conditions that allow production of the antibody spesolimab in the cell culture comprising feeding the cells in the cell culture with a feed medium, wherein copper(II) ($Cu^{2+}$) is added at 0.35-1.2 µM and iron at 1,500 µM or more to the culture medium prior to seeding the cells in step (i) and/or within 2 days after seeding; (b) harvesting the cell culture supernatant comprising the antibody spesolimab; and (c) optionally purifying the antibody spesolimab from the cell culture supernatant. Preferably, the $Cu^{2+}$ and the iron are added to the culture medium prior to seeding in step (i) and/or within 1 day after seeding, more preferably the $Cu^{2+}$ and the iron are added to the culture medium prior to seeding in step (i) or at the time of inoculation (i.e., the time of cell seeding). In one embodiment the $Cu^{2+}$ and/or the iron are added to the culture medium as one or more bolus additions or continuously. The one or more bolus addition includes providing the $Cu^{2+}$ and/or the iron with the basal medium. Thus, in certain embodiments step (i) comprises seeding the cells in a basal medium comprising $Cu^{2+}$ at 0.35-1.2 µM and iron at 1,500 µM or more. The culture medium in step (i) may also be referred to as a basal medium.

Copper is added at 0.35-1.2 µM to the culture medium prior to seeding the cells in step (i) and/or within 2 days or 1 day after seeding. The person skilled in the art would understand that the means of adding the copper to the culture medium are irrelevant and that addition prior to seeding the cells in step (i) includes that the copper is present in or is part of the culture medium according to step (i) and/or addition of a copper containing supplement to the ready mixed culture medium prior to seeding in step (i). In a preferred embodiment the $Cu^{2+}$ is added at 0.4-1.0 µM, more preferably at 0.5-0.8 µM to the culture medium prior to seeding the cells in step (i) and/or within 2 days, preferably 1 day after seeding. Copper(II) is typically provided as a salt or a hydrate thereof, suitable salts, without being limited thereto include $CuSO_4$ or $CuCl_2$. Preferably copper is provided as $CuSO_4$.

Iron is added at 1,500 µM or more to the culture medium prior to seeding the cells in step (i) and/or within 2 days or 1 day after seeding. The person skilled in the art would understand that the means of adding the iron to the culture medium are irrelevant and that addition prior to seeding the cells in step (i) includes that the iron is present in or is part of the culture medium according to step (i) and/or addition of an iron containing supplement to the ready mixed culture medium prior to seeding in step (i). In a preferred embodiment the iron is added at 2,000 µM or more, more preferably at 2,500 µM or at 3000 or more. Iron may be added up to 10,000 µM, preferably 5,000 µM, but typically lower concentrations are used, mainly due to solubility and precipitation of media components in the presence of high iron concentrations, but also due to potential toxicity issues with iron at very high concentrations. Thus, in certain embodiments, the iron concentration is 1,500 µM to 10,000 µM, 2,000 µM to 10,000 µM, 2,500 µM to 10,000 µM or 3,000 µM to 10,000 µM, preferably 1,500 µM to 5,000 µM, 2,000 µM to 5,000 µM, 2,500 µM to 5,000 µM or 3,000 µM to 5,000 µM. Iron is typically provided as a salt and/or in chelated from, suitable iron sources, without being limited thereto iron pyrophosphate ($Fe_4(P_2O_7)_3$), iron-III-ammonium citrate ($(NH_4)_5[Fe(C_6H_4O_7)_2]$), iron citrate ($C_6H_5FeO_7$), iron choline citrate, iron-III-nitrate, iron phosphate, iron sulfate and iron chloride. Preferred iron sources are iron citrate, iron choline citrate and iron chloride. Further suitable iron sources are known in the art and the person skilled in the art would know that the addition of certain chelators, such as citrate and/or choline may increase cellular uptake of iron, which may also be added separately to the iron source.

It is important in the context of the present invention that the copper and the iron is added (and/or present) at the specified concentration at the beginning of the growth phase, i.e., prior to seeding and/or within 2 days or 1 day after seeding, while the copper and iron concentration throughout cultivation, specifically production phase is less important. Particularly, due to the synergistic effect of copper reduction and iron increase on PBG and Man5 content, further reduction may be achieved or the same reduction may be achieved at a slightly higher copper concentration, thereby avoiding the negative effects of too low copper concentrations.

In certain embodiments the nucleic acid encoding the antibody spesolimab is stably integrated into the CHO genome. Methods for transfecting or transducing CHO cells with an antibody and selecting antibody producing clones are known in the art.

The method according to the invention comprises feeding the cells with feed medium. In certain embodiments the feed medium is added starting from day 0 to day 3 of the culture, preferably starting from day 1 to day 3, more preferably starting from day 1 to day 2, even more preferably starting on day 1. Although not essential, the feed medium may further comprise $Cu^{2+}$ ions. For example, the feed medium may add $Cu^{2+}$ ions at less than 15 nM, less than 12 mM, less than 10 nM daily, preferably less than 7 nM daily, more preferably less than 6 nM daily. The feed medium may further comprise iron ions. For example, the feed medium may add up to 100 µM iron daily, preferably up to 50 µM, 40 µM, 30 µM or 20 µM iron daily. The feed medium may further comprise $Cu^{2+}$ and iron ions at the specified concentrations. The feed medium used in the methods of the invention is to be added to the cells cultured in the basal cell culture medium, wherein (a) the feed medium is added at about 10-50 ml/L/day, preferably 20-35 ml/L/day, based on the culture starting volume, (b) the feed medium is added starting on day 0, 1, 2 or 3, and/or (c) the feed medium is added continuously, or as a bolus several times a day, two times a day, once per day, every second day or every third day.

In the method of the invention an increased iron concentration and/or a decreased copper concentration in the culture medium results in the production of the antibody spesolimab having reduced % BPG. The term "reduced % BPG" is to be understood in this context as relative to when the antibody spesolimab is produced by the same method using lower iron and/or higher copper concentrations, either within the ranges according to the method of the invention or relative to the same method using iron concentrations below the specified range and/or copper concentrations above the specified claimed range. In certain preferred embodiments, the antibody spesolimab produced by the method according to the invention has 7.5% BPG, preferably ≤7% BPG, more preferably ≤6.5% BPG, even more preferably 6% BPG. According to the present invention increasing the iron concentration reduces % BPG and may therefore compensate for a slightly higher copper concentration that cannot be further reduced due to other aspects.

Thus, the invention also relate to a method for reducing the % BPG of the antibody spesolimab comprising (a) cultivating CHO cells comprising a nucleic acid encoding the antibody spesolimab in a serum-free cell culture medium using fed-batch culture, comprising (i) seeding the cells in a culture medium, and (ii) culturing the cells in a culture medium under conditions that allow production of the antibody spesolimab in the cell culture comprising feeding the cells in the cell culture with a feed medium, wherein the % BPG are reduced by reducing $Cu^{2+}$ concentration and increasing the iron concentration provided to the culture medium prior to seeding the cells in step (i) and/or within 2 days after seeding, wherein the copper concentration provided to the culture medium is 0.35-1.2 µM and the iron concentration provided to the culture medium is at 1500 µM or more; (b) harvesting the cell culture supernatant comprising the antibody spesolimab; and (c) optionally purifying the antibody spesolimab from the cell culture supernatant. Preferably, the $Cu^{2+}$ and the iron are added to the culture medium prior to seeding in step (i) and/or within 1 day after seeding, more preferably the $Cu^{2+}$ and the iron are added to the culture medium prior to seeding in step (i) or at the time of inoculation (i.e., the time of cell seeding). In one embodiment the $Cu^{2+}$ and/or the iron are added to the culture medium as one or more bolus additions or continuously. The one or more bolus addition includes providing the $Cu^{2+}$ and/or the iron with the basal medium. Thus, in certain embodiments step (i) comprises seeding the cells in a basal medium comprising $Cu^{2+}$ at 0.35-1.2 µM and iron at 1500 µM or more. The term "reduced % BPG" is to be understood in this context as relative to when the antibody spesolimab is produced by the same method using lower iron and/or higher copper concentrations, either within the ranges according to the method of the invention or relative to the same method using iron concentrations below the specified range and/or copper concentrations above the specified claimed range. In certain preferred embodiments, the antibody spesolimab produced by the method according to the invention has 7.5% BPG, preferably 7% BPG, more preferably 6.5% BPG, even more preferably 6% BPG.

The term "% basic peak group (BPG)" as used herein refers to relative % peak area of total sum peak area as determined by cation exchange chromatography (CEX) in an HPLC chromatogram of the spesolimab profile (relative % of total antibody). The term "BPG" may also be referred to as basic species or basic variants of the antibody spesolimab.

BPG may be determined using cation exchange chromatography (CEX HPLC). More specifically, wherein the basic species correspond to the peak that elutes later than the main peak in an HPLC chromatogram of the spesolimab profile. In one embodiment the HPLC chromatogram is generated using a first mobile phase of 10 mM MOPS (3-(N-Morpholino)propanesulfonic acid, 4-Morpholine propanesulfonic acid) (pH 7.6) and a second mobile phase of 10 mM MOPS, 100 mM potassium chloride (pH 7.6), and wherein the HPLC chromatogram is generated using detection at 280 nm.

The level of BPG is mainly determined by upstream processes and is very little effected by downstream processes. Thus, the % BPG in the HCCF of spesolimab are similar to the % BPG in the drug substance. This is in contrast to, e.g., high molecular weight species (HMWs) or low molecular weight species (LMWs), which are typically reduced in the downstream process.

The methods according to the invention may further comprise adopting the seeding density. An increased seeding density results in the production of the antibody spesolimab having reduced % BPG and/or % Man5 structures. Thus, in certain embodiments the seeding density in step (a) is $0.7 \times 10^6$ cells/ml, preferably $0.7 \times 10^6$ cells/ml to $1.5 \times 10^6$ cells/ml, more preferably $0.8 \times 10^6$ cells/ml to $1.5 \times 10^6$ cells/ml, even more preferably $0.9 \times 10^6$ cells/ml to $1.3 \times 10^6$ cells/ml). The term "reduced % BPG and/or % Man5 structures" is to be understood in this context as relative to when the antibody spesolimab is produced by the same method using lower seeding densities, either within the range according to the method of the invention or relative to the same method using a seeding density below the specified range.

The methods according to the invention may further comprise adopting the culture temperature. In certain embodiments the cells are cultured at 36.0° C. to 37.5° C. under conditions that allow production of the antibody spesolimab comprising feeding the cells with a feed medium. Preferably the culture temperature is in the range of 36.0° C. to 37.3° C. or 36.5° C. to 37.0° C. The method may also comprise adopting the dissolved oxygen (DO) concentration. In certain embodiments the dissolved oxygen (DO) concentration in said culture is maintained within a range of 30-60%, preferably within a range of 40-50%, more preferably within a range of 40-45%. An increased culture temperature and/or reduced dissolved oxygen results in the production of the antibody spesolimab having reduced % BPG and/or reduced % Man5 structures. The term "reduced % BPG" and/or "reduced % Man5 structures" is to be understood in this context as relative to when the antibody spesolimab is produced by the same method using a lower culture temperature and/or a higher DO concentration, either within the claimed range according to the method of the invention or relative to the same method using a culture temperature below the specified range or a dissolved oxygen concentration above the specified range. In certain embodiments the antibody spesolimab has less than 5% Man5 structures, preferably less than 4% Man5 structures, more preferably less than 3% Man5 structures, and/or ≤7.5% BPG, preferably ≤7% BPG, more preferably 6.5% BPG, and even more preferably ≤6% BPG. The culture temperature may also depend on the cell line used. For example, CHO-K1 cells tend to have the optimal culture temperature at lower temperature (such as 33-36° C.) compared to CHO-DG44 with an optimal culture temperature of about 36.0-37.5° C., preferably 36.5 to 37.0° C.

The term "% Man5 structures" as used herein refers to % Mannose-5 peak area (peak 3) relative to sum of or total areas of all glycosylation peaks (in FIG. 5) as determined by hydrophilic interaction chromatography (HILIC-HPLC), preferably hydrophilic interaction ultra performance liquid chromatography (HILIC-UPLC). The Man5 structures are represented by the % peak area of peak 3.

High mannose structures, particularly Man5 structures, may be determined using hydrophilic interaction chromatography (HILIC), preferably hydrophilic interaction ultra performance liquid chromatography (HILIC-UPLC). In one embodiment the Man5 fraction is determined following enzymatic oligosaccharides release with N-glycosidase F (PNGase F) and 2-amino benzamide (2-AB) labelling using a HILIC-UPLC.

Similar to the BPG levels, the level of high mannose and particularly of Man5 structures is mainly determined by upstream processes and is very little effected by downstream processes. Thus, the % Man5 structures in the HCCF of spesolimab are similar to the % Man5 structures in the drug substance. This is in contrast to, e.g., high molecular weight species (HMWs) or low molecular weight species (LMWs), which are typically reduced in the downstream process.

The mammalian cell used in the methods of the invention is a Chinese hamster ovary (CHO) cell such as a CHO-K1 cell, a CHO-DG44 cell, a DuxB11 cell or a CHO GS deficient cell, preferably the cell is a CHO-DG44 or a CHO-K1 cell. CHO cells that allow for efficient cell line development processes are metabolically engineered, such as by glutamine synthetase (GS) knockout and/or dihydrofolate reductase (DHFR) knockout to facilitate selection with methionine sulfoximine (MSX) or methotrexate, respectively. CHO cells used in the method according to the invention include CHO-K1, CHO-DXB11 (also referred to as CHO-DUKX or DuxB11), CHO-DUKX B1, CHO-S, CHO-DG44 and CHO glutamine synthetase (GS) deficient cells or the derivatives/progenies of any of such cell lines. Preferred are CHO-DG44, CHO-DUKX, CHO-K1, CHO-S, and CHO-DG44 GS deficient cell lines, particularly preferred CHO-DG44 and CHO-K1 cells, and even more preferred CHO-DG44 cells. According to the present invention the CHO cells are cultured as suspension cells. Non-limiting examples of mammalian cells, which can be used with the media of the present invention are summarized in Table 1.

TABLE 1

| Suitable exemplary mammalian production cell lines | |
|---|---|
| Cell Line | Exemplary Reference Number/Source |
| CHO | ECACC No. 8505302 |
| CHO wild type | ECACC 00102307 |
| CHO-DUKX (=CHO duk, CHO/dhfr) | ATCC CRL-9096 |
| CHO-DUKX B11 | ATCC CRL-9010 |
| CHO-DG44 | Urlaub et al., Cell 33 (2), 405 - 412, 1983; Life Technologies A1097101 |
| CHO Pro-5 | ATCC CRL-1781 |
| CHO-S | Life Technologies A1136401; CHO-S is derived from CHO variant Tobey et al. 1962 |
| CHO-K1 | ATCC CCL-61, ECACC 85051005 |
| CHO-K1/SF | ECACC 93061607 |
| CHO-K1 GS | glutamine synthetase (GS) deficient cells derived from CHO-K1 |
| CHOZN GS | GS deficient cells derived from CHO-K1 (SAFC ECACC 85051005) |

Said production CHO cells are cultivated preferentially under conditions that allow the cells to proliferate. Furthermore, said production CHO cells are cultivated preferentially under conditions, which are favorable for the expression of the antibody spesolimab. The antibody spesolimab is than isolated from the cells and/or the cell culture supernatant. Preferably the antibody spesolimab is recovered from the culture medium as a secreted polypeptide.

The antibody spesolimab is purified from HCCF, other recombinant proteins, host cell proteins and contaminants in a downstream process. The samples obtained and/or analyzed at the various steps of purification are also referred to as in-process control (IPC) samples or process intermediates. The harvest typically includes centrifugation and/or filtration, such as to produce a harvested cell culture fluid. Thus, the harvested cell culture fluid may also be referred to as clarified harvested cell culture fluid. It does not contain living cells and cell debris as well as most cell components have been removed. Clarified typically means centrifugation or filtration, preferably filtration. Further process steps may include affinity chromatography, particularly Protein A column chromatography, to separate the antibody spesolimab from contaminants. Further process steps may include acid treatment to inactivate viruses, clarifying the product pool by depth filtration, preferably following acid treatment, to remove cell contaminants, such as HCPs and DNA. Further process steps may include in this order or any other order as may be appropriate in the individual case: ion exchange chromatography, particularly anion exchange chromatography to further remove contaminating cell components and/or cation exchange chromatography to remove product related contaminants, such as aggregates. Further, preferably following process steps may include nanofiltration to further remove viruses and ultrafiltration and diafiltration to concentrate the recombinant protein and to exchange buffer, respectively.

The sample comprising the antibody spesolimab purified from the HCCF following, e.g., following protein A column, acid treatment, depth filtration, anion exchange chromatography and/or cation exchange chromatography, may also be referred to as "purified antibody product pool". The purified antibody product pool may be further purified and may, but does not need to be formulated with excipients. Thus, the purified antibody product pool can be identical with the drug substance, but may also be present at a different concentration and/or in a different buffer system.

In another aspect a method for producing the antibody spesolimab in cell culture is provided comprising (a) cultivating CHO cells comprising a nucleic acid encoding the antibody spesolimab in a serum-free cell culture medium using fed-batch culture, comprising (i) seeding the cells in a culture medium at a cell density of $\geq 0.7 \times 10^6$ cells/ml, and (ii) culturing the cells in a culture medium under conditions that allow production of the antibody spesolimab in the cell culture comprising feeding the cells in the cell culture with a feed medium, wherein optionally $Cu^{2+}$ is added at 0.35-1.2 µM and iron at 1500 µM or more to the culture medium prior to seeding the cells in step (i) and/or within 2 days after seeding; (b) harvesting the cell culture supernatant comprising the antibody spesolimab; and (c) optionally purifying the antibody spesolimab from the cell culture supernatant. An increased seeding density results in the production of the antibody spesolimab having reduced % BPG and/or % Man5 structures. In certain embodiments the seeding density in step (a) is $0.7 \times 10^6$ cells/ml to $1.5 \times 10^6$ cells/ml, more preferably $0.8 \times 10^6$ cells/ml to $1.5 \times 10^6$ cells/ml, even more preferably $0.9 \times 10^6$ cells/ml to $1.3 \times 10^6$ cells/ml. The term "reduced % BPG and/or % Man5 structures" is to be understood in this context as relative to when the antibody spesolimab is produced by the same method using lower seeding densities, optionally either within the range according to the method of the invention or relative to the same method using a seeding density below the specified range and optionally relative to the same method using lower iron and/or higher copper concentrations, either within the ranges according to the method of the invention or relative to the same method using iron concentrations below the specified range and/or copper concentrations above the specified claimed range. The embodiments and modifications or disclosures with regard to the previous aspect similarly apply to the method according to this aspect. Increasing the culture temperature may further reduce the BPG and/or Man5 structures. The exact culture temperature may depend on the CHO cell used and is preferably between 36.0° C. to 37.5° C., but may be between 33-36° C. for other CHO cells. Also reducing dissolved oxygen (maintaining $dO_2$ between 30 and 60%) may further reduce BPG and/or Man5 structures. Thus, in certain embodiments an increased culture temperature and/or reduced dissolved oxygen results in the production of the antibody spesolimab having reduced % BPG and/or % Man5 structures. In preferred embodiments the produced antibody spesolimab has less than 5% Man5 structures, preferably less than 4% Man5 structures, more preferably less than 3% Man5 structures, and/or $\leq 7.5\%$ BPG, preferably $\leq 6.5\%$ BPG.

In another aspect, the present invention provides a composition comprising the antibody spesolimab, wherein the antibody spesolimab is obtained by the method according to the invention. In certain embodiments the composition comprises the antibody spesolimab having (a) $\leq 7.5\%$ BPG, preferably $\leq 7\%$ BPG, more preferably $\leq 6.5\%$ BPG, even more preferably $\leq 6\%$ BPG less than 7% BPG, preferably less than 6% BPG; and/or (b) less than 5% Man5 structures, preferably less than 4% Man5 structures, more preferably less than 3% Man5 structures, preferably less than 2% Man5 structures. The composition may be a harvest cell culture fluid (HCCF), an affinity capture pool, a drug substance or a drug product. Preferably the composition is a drug substance or a drug product.

In yet another aspect, provided is a composition comprising the antibody spesolimab having (a) $\leq 7.5\%$ BPG, preferably $\leq 7\%$ BPG, more preferably $\leq 6.5\%$ BPG, even more preferably $\leq 6\%$ BPG; and/or (b) less than 5% Man5 structures, preferably less than 4% Man5 structures, more preferably less than 3% Man5 structures, preferably less than 2% Man5 structures. The composition may be a harvest cell culture fluid (HCCF), an affinity capture pool, a drug substance or a drug product. Preferably the composition is a drug substance or a drug product.

The antibody spesolimab in the compositions according to the invention may further be characterized by low overall glycation comprises and particularly no glycation at critical lysines, i.e., lysines close to the CDRs of the antibody, such as within 3 amino acids of the CDRs. Thus, in one embodiment the antibody spesolimab has $\leq 6\%$ lysine glycated variants of the heavy chain (HC), preferably $\leq 3\%$ lysine glycated variants of the HC and/or lysines K38 and K67 of the heavy chain (HC) are not glycated and glycation at K23 is $\leq 0.3\%$. In certain embodiments the antibody spesolimab further has $\leq 2\%$ lysine glycated variants of the light chain (LC), preferably $\leq 1\%$ lysine glycated variants of the light chain (LC). The resulting LC and deglycosylated HC were separated by reversed phase-high performance chromatography (RP-HPLC) and analyzed online by ESI Q-TOF MS (Xevo G2 Q-TOF). The protein subunits and the corresponding glucose adducts (Mglucose addition=162 Da) are analyzed and the acquired spectra are deconvoluted using MaxEnt™ algorithm.

The term "% lysine glycated variants of the heavy chain" as used herein refers to the percent of glycated heavy chain (HC+glucose) of total heavy chain (glycated and non-glycated HC). The term "% lysine glycated variants of the light chain" as used herein refers to the percent of glycated light chain (LC+glucose) of total light chain (glycated and non-glycated LC). The lysine glycated and unglycated variants of the LC and/or HC may be determined by separating reduced and deglycosylated (such as N-Glycosidase F treated) LC and HC by reversed phase-high performance chromatography (RP-HPLC) and analysis by ESI Q-TOF MS.

Glycation of single lysines may be analysed in chemotrypsin digested peptides following denaturation and iodoacetic acid alkylation of spesolimab by reversed phase liquid chromatography (LC-MS) and ESI-MS. The relative amount of glycated peptides are quantified based on the extracted ion chromatograms of the wild-type peptides and the peptides carrying a glucose adduct (+162 Da).

Also provided herein is a composition comprising the antibody spesolimab comprises 6% lysine glycated variants of the HC, preferably 3% lysine glycated variants of the HC and/or wherein lysines K38 (HC) and K67 (HC) are not glycated and glycation at K23 (HC) is 0.3%. In certain embodiments the antibody spesolimab further has 2% lysine glycated variants of the light chain (LC), preferably 1% lysine glycated variants of the light chain (LC).

Also provided herein is a composition comprising the antibody spesolimab comprising APG subfractions AP4 at less than 1% and AP3 fractions at less than 4%, particularly AP4 at less than 1% and AP3b fractions at less than 1%.

In view of the above, it will be appreciated that the invention also encompasses the following items:

1. A method for producing the antibody spesolimab in cell culture comprising
    (a) cultivating CHO cells comprising a nucleic acid encoding the antibody spesolimab in a serum-free cell culture medium using fed-batch culture, comprising
        (i) seeding the cells in a culture medium, and
        (ii) culturing the cells in a culture medium under conditions that allow production of the antibody spesolimab in the cell culture comprising feeding the cells in the cell culture with a feed medium, wherein $Cu^{2+}$ is added at 0.35-1.2 µM and iron at 1500 µM or more to the culture medium prior to seeding the cells in step (i) and/or within 2 days after seeding;
    (b) harvesting the cell culture supernatant comprising the antibody spesolimab; and
    (c) optionally purifying the antibody spesolimab from the cell culture supernatant.
2. A method for reducing the % BPG of the antibody spesolimab comprising
    (a) cultivating CHO cells comprising a nucleic acid encoding the antibody spesolimab in a serum-free cell culture medium using fed-batch culture, comprising
        (i) seeding the cells in a culture medium, and
        (ii) culturing the cells in a culture medium under conditions that allow production of the antibody spesolimab in the cell culture comprising feeding the cells in the cell culture with a feed medium, wherein the % BPG are reduced by reducing $Cu^{2+}$ concentration and increasing the iron concentration provided to the culture medium prior to seeding the cells in step
        (i) and/or within 2 days after seeding, preferably wherein the copper concentration provided to the culture medium is 0.35-1.2 µM and the iron concentration provided to the culture medium is at 1500 µM or more;
    (b) harvesting the cell culture supernatant comprising the antibody spesolimab; and
    (c) optionally purifying the antibody spesolimab from the cell culture supernatant.
3. The method of item 1 or 2, wherein the $Cu^{2+}$ and the iron are added to the culture medium prior to seeding in step (i) and/or within 1 day after seeding.
4. The method of any one of items 1 to 3, wherein the $Cu^{2+}$ and the iron are added to the culture medium as one or more bolus additions or continuously.
5. The method of any one of the preceding items, wherein the nucleic acid encoding the antibody spesolimab is stably integrated into the CHO genome.
6. The method of any one of the preceding items, wherein feed medium is added starting from day 0 to day 3 of the culture.
7. The method of any one of the preceding items, optionally wherein the feed medium adds less than 15 nM $Cu^{2+}$ daily and/or up to 100 µM iron.
8. The method of any one of the preceding items, wherein an increased iron concentration and/or a decreased copper concentration in the culture medium results in the production of the antibody spesolimab having reduced % BPG.
9. The method of any one of the preceding items, wherein the antibody spesolimab has 7.5% BPG, preferably ≤7% BPG, more preferably ≤6.5% BPG, even more preferably ≤6% BPG.
10. The method of item 8, wherein the BPG are determined using cation exchange chromatography (CEX HPLC).
11. The method of any one of the preceding items, wherein the seeding density in step (a) is $0.7 \times 10^6$ cells/ml, preferably $0.7 \times 10^6$ cells/ml to $1.5 \times 10^6$ cells/ml, more preferably $0.8 \times 10^6$ cells/ml to $1.5 \times 10^6$ cells/ml, even more preferably $0.9 \times 10^6$ cells/ml to $1.3 \times 10^6$ cells/ml.
12. A method for producing the antibody spesolimab in cell culture comprising
    (a) cultivating CHO cells comprising a nucleic acid encoding the antibody spesolimab in a serum-free cell culture medium using fed-batch culture, comprising
        (i) seeding the cells in a culture medium at a cell density of $\geq 0.7 \times 10^6$ cells/ml, and
        (ii) culturing the cells in a culture medium under conditions that allow production of the antibody spesolimab in the cell culture comprising feeding the cells in the cell culture with a feed medium, wherein optionally $Cu^{2+}$ is added at 0.35-1.2 µM and iron at 1500 µM or more to the culture medium prior to seeding the cells in step (i) and/or within 2 days after seeding;
    (b) harvesting the cell culture supernatant comprising the antibody spesolimab; and
    (c) optionally purifying the antibody spesolimab from the cell culture supernatant.
13. The method of any one of the preceding items, wherein an increased seeding density results in the production of the antibody spesolimab having reduced % BPG and/or % Man5 structures.
14. The method of any one of the preceding items, wherein the cell are cultured at 36.0° C. to 37.5° C. under conditions that allow production of the antibody spesolimab comprising feeding the cells with a feed medium, and/or wherein the dissolved oxygen (DO) concentration in said culture is maintained within a range of 30-60%.

15. The method of any one of the preceding items, wherein an increased culture temperature and/or reduced dissolved oxygen results in the production of the antibody spesolimab having reduced % BPG and/or % Man5 structures.
16. The method of any one of the preceding items, wherein the antibody spesolimab has less than 5% Man5 structures, preferably less than 4% Man5 structures, more preferably less than 3% Man5 structures, and/or ≤7.5% BPG, preferably ≤6.5% BPG.
17. The method of any one of the preceding items, wherein the CHO cell is a CHO-K1 or a CHO-DG44 cell
18. A composition comprising the antibody spesolimab having
    (a) 7.5% BPG, preferably 7% BPG, more preferably 6.5% BPG, even more preferably 6% BPG; and/or
    (b) less than 5% Man5 structures, preferably less than 4% Man5 structures, more preferably less than 3% Man5 structures.
19. A composition comprising the antibody spesolimab, wherein the antibody spesolimab is obtained by the method according to any one of items 1-17.
20. The composition of item 18 or 19, wherein the composition is a harvest cell culture fluid (HCCF), an affinity capture pool, a drug substance or a drug product, preferably a drug substance or a drug product.
21. The composition of any one of items 18 to 20, wherein the composition is a drug product comprising the antibody spesolimab having less than 7.5% BPG and/or less than 5% Man5 structures.
22. The composition of any one of items 18 to 21, wherein the antibody spesolimab comprises ≤6% lysine glycated variants of the heavy chain (HC) and/or wherein lysines K38 (HC) and K67 (HC) are not glycated and glycation at K23 (HC) is 0.3%.
23. A composition comprising the antibody spesolimab comprises 6% lysine glycated variants of the heavy chain (HC) and/or wherein lysines K38 (HC) and K67 (HC) are not glycated and glycation at K23 (HC) is ≤0.3%.
24. A composition comprising the antibody spesolimab comprising APG subfractions AP4 at less than 1% and AP3 fractions at less than 4%, particularly AP4 at less than 1% and AP3b fractions at less than 1%.

EXAMPLES

Cell Lines

CHO cell lines (CHO-DG44) were adapted to serum-free media conditions and further transfected with DNA to produce recombinant mAb spesolimab. Specifically, BI HEX (Boehringer-Ingelheim High Expression) CHO-DG44 derived CHO cell lines that were independently adapted to serum-free media (named HEX II) were used. These cells are DHFR (dihydrofolate-reductase) deficient and methotrexate was used as selection marker.

Analytical Methods

Cell concentrations and cell viabilities were determined by the trypan blue exclusion method using a CEDEX Hires (version 2.2.3) automated cell analyzer (Roche Diagnostics, Mannheim, Germany). The concentrations of produced recombinant mAb in the medium, were quantified by a Konelab 60i (Thermo Scientific, Dreieich, Germany) analyzer based on photometrical methods. The Konelab 60i instrument was also used for the quantification of metabolites such as glucose, lactic acid (lactate), glutamine, glutamate, and ammonium in the cell culture supernatants. Osmolarity profiles were analyzed by an osmomat auto device (Gonotec GmbH, Berlin, Germany). This method is based on the cryoscopic freezing point of a particular solution, which is proportional to the amount of dissolved particles. Dissolved carbon dioxide pCO2, dissolved oxygen pO2 and pH were determined on a daily basis with a Rapidlab 248/348 blood gas analyzer (Siemens Healthcare Diagnostics GmbH, Eschborn, Germany). These instruments and the required methods are well known in the art and used for process monitoring and control in biopharmaceutical process development and manufacturing.

Batch and Fed-Batch Mode

For the production of antibodies, typically fed-batch processes are used in the final production stage, while batch cultivations are mainly performed in the cell expansion stages prior to the final production stage. A series of batch cultures is referred to as seed train during cell expansion, meaning that cells are transferred in each expansion step into cultivations vessels with larger cultivation volumes. Batch processes in the final production stage do generally not result in high productivity and are therefore rarely used for manufacturing recombinant proteins. In fed-batch processes concentrated feed medium is added during cultivation to compensate for replenishment of nutrients with fresh medium. These processes achieve a higher productivity and are therefore used predominantly in recombinant protein production. In contrast to the batch mode, a replenishment of nutrients by adding concentrated feed medium also reduces inhibition of cell growth by unwanted metabolic by-products such as lactate or ammonium. Typically fed-batch processes are started at a volume much lower than the maximal capacity of a stirred tank so that concentrated nutrient solutions can be added over the bioreactor cultivation time. The fed-batch cultivations were conducted for 14 days.

Bioreactor Cultivation

The bioreactor experiments were performed in a controlled 48-mini-bioreactor system with a volume of maximal 15 ml (ambr 15 bioreactor system) or in a controlled 24-mini-bioreactor system with a nominal volume of 250 ml (ambr 250 bioreactor system) using a proprietary basal and feed medium. The fully controlled bioreactors were conducted in fed-batch mode. A concentrated feeding solution was continuously added by a feed pump from cultivation from day 1 onwards with a feeding rate of 33 ml/L/d or varied in the experiment (based on the culture starting volume) as indicated. The seeding density was set to $1.0 \times 10^6$ cells/ml or varied in the experiment as indicated. The dissolved oxygen concentration was kept at 60% or varied in the experiment as indicated. The expansion of cells over a longer time frame followed a standard seed train protocol for cell growth and culture splits in order to ensure phenotypic stability. This procedure ensures comparability between different experimental settings at different time points. The standard process format consists of a pH range from 7.10-6.95 (+/−0.25) and a constant stirring rate of 1000 to 1150 rpm in the 48-mini-bioreactor system and a constant stirring rate of 614 rpm in the 24-mini-bioreactor system. Temperature was maintained at 36.5 C or varied in the experiment. Glucose was fed on demand to maintain the actual glucose concentration between 2-4 g/l over the cultivation period. The analytical methods as described above were used to determine the major culture parameters such as cell count, cell viability, and major carbon metabolite concentrations to provide an ideal nutrient supply to the cell culture. In the bioreactor systems pH and pO2 was monitored online. The offline process parameters and set-points were fully controlled by a control software using an automatic closed-loop system for monitoring, e.g., the pH control, nutrient feed addition, temperature control, stirring and gassing. This culture process can be and has been successfully scaled up to 2,000 and 12,000 L.

Detection of Charge Variants

Cation exchange chromatography (CEX HPLC) permits the separation of proteins and protein populations according to their electrical charge, whereas the salt content in the gradient increases at a constant pH. Due to their functional groups and their micro-heterogeneity, proteins can carry either positive or negative charges. CEX HPLC uses these pH dependent charges to promote separation of different proteins/protein modifications.

Samples were prepared comprising an antibody concentration of about 1 mg/mL in mobile phase A and analysed using an HPLC system with gradient elution, a temperature controlled autosampler and a UV detector using the HPLC column MAbPac SCX-10, 4×250 nm, 10 µm.

The HPLC chromatogram is generated using a first mobile phase (eluent A) of 10 mM MOPS (3-(N-Morpholino)propanesulfonic acid, 4-Morpholine propanesulfonic acid) (pH 7.6) and a second mobile phase (eluent B) of 10 mM MOPS, 100 mM potassium chloride (pH 7.6). Elution was performed by running a linear gradient of 40 minutes from 15% to 85% eluent A at a flow-rate of 0.8 mL/min. Detection was done at 280 nm wavelength UV-Detector.

APG (acidic peak group), Main Peak and BPG (basic peak group) were separated by split using a continuous baseline. The integration range starts at approximately 2 min and ends at approximately 44 min. Acidic Peak group can be further separated into 7 subspecies eluting in the following order from the main peak. AP1 (a,b,c), AP2, AP3 (a,b) and AP4 at the following retention times (Table 2). The integration of single peaks were splitted by using the retention times below, whereas the main peak is the reference peak. Integration have been done according the reference chromatogram shown in FIG. 4A-B

TABLE 2

Example for the integration and split setting start for acidic peaks

| Peaks | RT (min) |
|---|---|
| AP4 | 16.0-18.7 |
| AP3b | 18.7-20.6 |
| AP3a | 20.6-22.7 |
| AP2 | 22.7-24.1 |
| AP1c | 24.1-26.0 |
| AP1b | 26.0-27.3 |
| AP1a | 27.3-28.2 |
| MP | 28.2-30.2 |
| BP1 | 30.2-31.7 |
| BP2 | 31.7-33.5 |
| BP3 | 33.5-36.2 |

Detection of Glycosylation Variants

Analysis sample and reference standard were prepared in duplicate using 0.2 mg protein per sample The oligosaccharides were enzymatically released from the sample/reference standard with PNGase F (NEB P0704L, according to the manufactures instructions) and labeled with 2-amino benzamide (2-AB (Ludger; LT-KAB-A2) according to the manufactures instructions). Purified water was used as blank control and was prepared in parallel to the samples/reference standard. The labeled oligosaccharides were analyzed using an UPLC (e.g. Nexera, Fa. Shimadzu))) with a HILIC column (Glycan BEH Amide column, 130 Å, 1.7 µm, 2.1 mm×150 mm) and a fluorescence detector (FLD). This method was used to determine the oligosaccharide profile (Oligo Map) and to quantify oligosaccharide structures of spesolimab drug substance or protein A pool. Following N-glycan release and 2-AB-labeling aliquots were purified using aminopropyl cartridges (e.g. SepPak; Waters; WAT020840 using a vacuum chamber or an automated Solid phase extraction system. The eluted fractions were dried using an evaporator and resuspended in 80 µl prior to HPLC analysis using a flow rate of 0.7 mL/min and a wavelength FL detector (extinction wavelength 330 nm; emission wavelength 420 nm) a mobile phase A (0.05 M ammonium format, pH 4.5/50% acetonitrile (ACN)) and a mobile phase B: Acetonitrile HPLC-grade (ACN)) at the following gradient. Elution was performed by running a linear gradient of 25 minutes from 50% to 80% eluent A.

The integration range for the chromatograms of the reference standard and the sample is approximately 4 to 20 minutes. The retention time varies slightly depending on the equipment and mobile phases used. The relative peak areas of peak 3 (FIG. 5, also referred to as (Oligo Man Peak 311 is calculated according to the formular below $$\text{Relative area Peak } x[\%] = \frac{\text{Absolute peak area peak } x}{\text{Absolute peak area (all integrated peaks)}} * 100\%$$

Peak x=1, 2, 3, 4, 5 or 6
Absolute peak area=sum of all integrated peak area
The relative peak areas of all peaks from one injection were referred to as the sum of peaks (absolute peak area). Peak 3 comprises the high mannose (Man5) structures.

Example 1

Influence of Iron and Copper on BPG and High Mannose

The effect of different concentrations of iron and copper as well as their interaction, on cell culture performance and product quality parameters, including acidic and basic charge variants (acidic peak group (APG) and basic peak group (BPG)) and high mannose species was investigated in a design of Experiment (DOE) approach. A DOE study is a data collection and analysis tool that allows varying multiple input factors and determines their combined and single effects on different output parameters. Thus, this kind of study can identify interactions of multiple factors in a process by altering the levels of multiple inputs simultaneously in the process.

24 cultivation experiments in fully automated 15 mL mini-bioreactors were conducted with process conditions as described above. Cells were seeded in basal medium at $1.0 \times 10^6$ cells/ml. The iron concentration in the basal medium was varied between 1.4-6.0 mM using iron choline citrate (Dr. Paul Lohmann GmbH KG) as iron source. Iron choline citrate (0.7, 1.4, 2.1 and 3.0 g/L iron choline citrate) was directly added to the media formulation comprising 5.8 pM iron (ferric nitrate and ferrous sulfate) prior to sterile filtration. Copper was provided as CuSO$_4$ and varied between 0.36 to 1.71 µM. Additional copper solution (CuSO$_4$) was supplemented in a post sterile addition directly to the basal medium comprising 0.139 µM CuSO$_4$ in the bioreactor prior to inoculation. The feed medium was added daily at 30 ml/L/day comprising 1.13 mM iron (provided as iron choline citrate; 565 pM) and 0.43 mM CuSO$_4$.

Output parameters evaluated with the statistical software suite (Design Expert, Stat Ease, Inc.) were spesolimab product titer, integrated viable cell density, day 14 viability and the product quality parameters APGs, BPG measured by cation exchange chromatography (CEX) and high mannose species represented through Mannose 5 structure determined by HILIC UHPLC (Table 3).

TABLE 3

Overview of Experiment Design

| Run | Factor | | Response | | | | | |
|---|---|---|---|---|---|---|---|---|
| DoE Run No | 1 A Cu [µm] | 1 B Fe [µm] | Product conc. [mg/L] | IVC [1e6 viable cells * h/mL] | Viability [%] | HP-SCX APGs [%] | HP-SCX BPG [%] | HP-SCX Main peak [%] |
| DoE Run No 1 | 1.709 | 6060.2 | 3275 | 2716 | 39.5 | 38.8499 | 7.6791 | 53.471 |
| DoE Run No 2 | 0.57 | 1418.5 | 2489 | 2574 | 30.7 | 42.6608 | 5.7762 | 51.563 |
| DoE Run No 3 | 0.359 | 1418.5 | 2570 | 2548 | 29.8 | 41.6469 | 5.5415 | 52.8117 |
| DoE Run No 4 | 0.359 | 1418.5 | 2540 | 2559 | 30.2 | 41.8276 | 5.4723 | 52.7001 |
| DoE Run No 5 | 1.709 | 6060.2 | 3135 | 2732 | 36.4 | 39.526 | 7.5707 | 52.9033 |
| DoE Run No 6 | 0.359 | 6060.2 | 3021 | 2692 | 32.1 | 40.8427 | 4.9329 | 54.2244 |
| DoE Run No 7 | 1.709 | 4243.9 | 3359 | 2845 | 39.3 | 38.5471 | 7.9149 | 53.538 |
| DoE Run No 8 | 0.926 | 6060.2 | 3430 | 2750 | 39.1 | 38.7951 | 6.2244 | 54.9805 |
| DoE Run No 9 | 0.926 | 6060.2 | 3336 | 2856 | 38.7 | 39.5181 | 6.1785 | 54.3033 |
| DoE Run No 10 | 0.926 | 4243.9 | 3135 | 2732 | 36.4 | 40.2692 | 6.2954 | 53.4354 |
| DoE Run No 11 | 0.57 | 2831.2 | 3015 | 2665 | 34.4 | | | |
| DoE Run No 12 | 1.709 | 6060.2 | 3114 | 2670 | 32.5 | 39.6907 | 7.5364 | 52.7728 |
| DoE Run No 13 | 0.359 | 6060.2 | 3368 | 2972 | 41.1 | 40.0037 | 4.8158 | 55.1805 |
| DoE Run No 14 | 1.709 | 1418.5 | 2733 | 2646 | 31.6 | 40.7905 | 8.4525 | 50.757 |
| DoE Run No 15 | 0.359 | 4243.9 | 3090 | 2822 | 35.3 | 40.3784 | 5.0608 | 54.5607 |
| DoE Run No 16 | 0.926 | 4243.9 | 3208 | 2821 | 36.8 | 40.7413 | 6.3177 | 52.941 |
| DoE Run No 17 | 0.359 | 2831.2 | 3024 | 2738 | 33.7 | 40.3231 | 5.2703 | 54.4066 |
| DoE Run No 18 | 1.709 | 1418.5 | 2707 | 2690 | 30.7 | 40.9797 | 8.5259 | 50.4944 |
| DoE Run No 19 | 1.709 | 1418.5 | 2770 | 2472 | 32.8 | 40.4689 | 8.5401 | 50.991 |

TABLE 3-continued

Overview of Experiment Design

| Run | Factor | | Pro-duct conc. [mg/L] | IVC [1e6 viable cells * h/mL] | Response | | | |
|---|---|---|---|---|---|---|---|---|
| DoE Run No | 1 A Cu [μm] | 1 B Fe [μm] | | | Via-bility [%] | HP-SCX APGs [%] | HP-SCX BPG [%] | HP-SCX Main peak [%] |
| DoE Run No 20 | 0.359 | 6060.2 | 3126 | 2813 | 34 | 40.1859 | 5.0883 | 54.7258 |
| DoE Run No 21 | 0.926 | 1418.5 | 2671 | 2568 | 30.5 | 40.7017 | 7.7322 | 51.5662 |
| DoE Run No 22 | 0.359 | 1418.5 | 2506 | 2434 | 27.5 | 41.5386 | 5.8857 | 52.5758 |
| DoE Run No 23 | 1.709 | 2831.2 | 3144 | 2805 | 34.3 | 39.2898 | 8.3987 | 52.3115 |
| DoE Run No 24 | 0.926 | 2831.2 | 2959 | 2644 | 31 | 40.4996 | 6.7522 | 52.7482 |

Figure 1F:
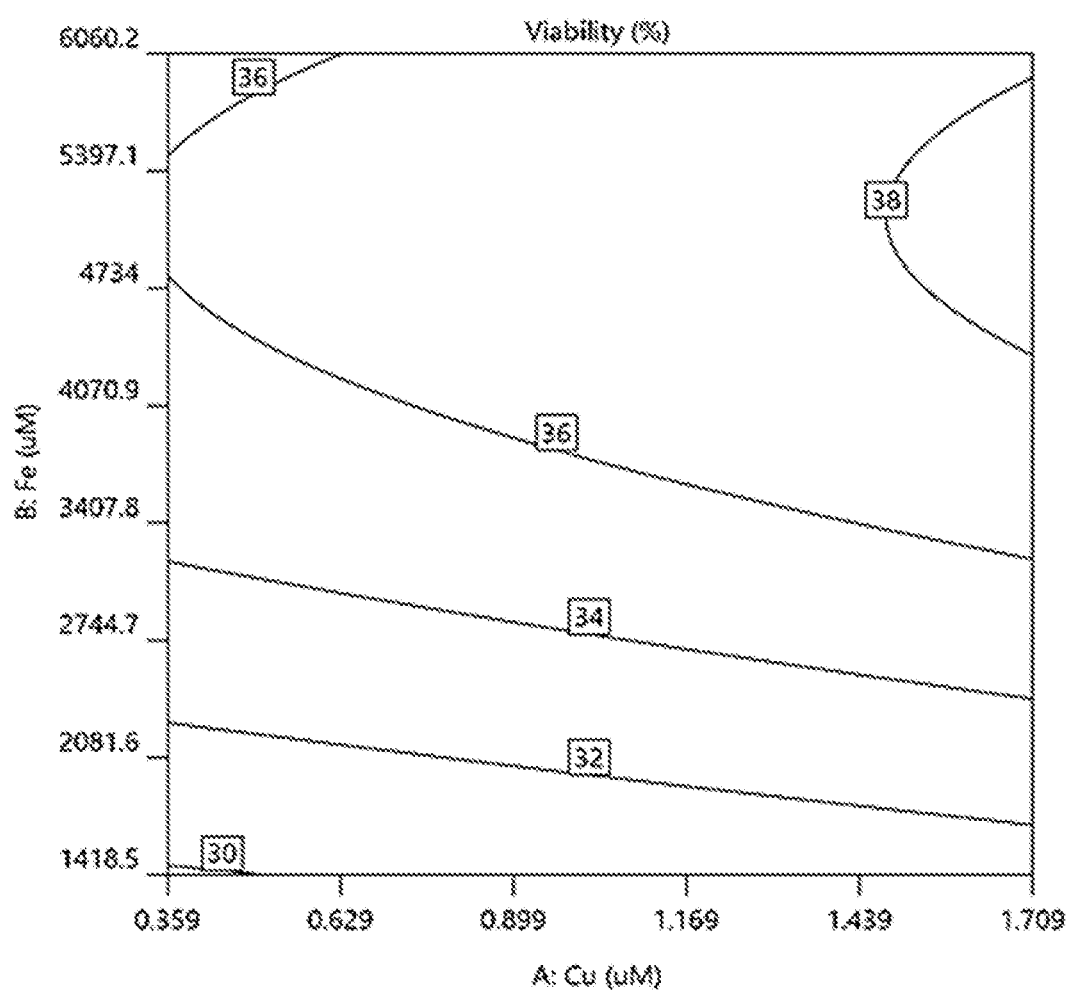

The results shown in FIG. 1A-F demonstrate that lowest BPG are reached with high iron concentrations and low copper concentrations (FIGS. 1A, B and C). Likewise, higher iron concentrations and lower copper concentrations seem to be beneficial for titer (FIG. 1D), viable cell density (FIG. 1E) and viability (FIG. 1F).

Example 2

Influence of Process Parameters on BPG and High Mannose

Cell culture process parameters seeding cell density, cultivation temperature and dissolved oxygen concentration were evaluated in a DOE approach, to investigate their influence on product quality parameters BPG and high mannose species. Seeding cell density was varied from 0.5 to 1.5 million cells/ml, temperature from 35° C. to 38° C., the dissolved oxygen concentration in the bioreactors was varied from 40 up to 80% and the feed rate was varied from 29.7 up to 36.3 mL per L based on the culture starting volume per day. 24 parallel runs were conducted in fed batch mode for 14 days in a fully automated 24-mini-bioreactor system. Other cultivations parameters and analytical methods were performed as described above. Output parameters evaluated with the statistic software suite (Design Expert, Stat Ease, Inc.) were spesolimab product titer, integrated viable cell density, day 14 viability and the product quality parameters APGs, BPG measured by CEX and high mannose 5 species determined by HILIC-UHPLC (Table 4).

TABLE 4

Influence of Process Parameters on BPG and High Mannose

| Run | Factor | | | | Response | | | |
|---|---|---|---|---|---|---|---|---|
| | 1 (A) SCD [1e6cells/mL] | 2 (B) Temper-ature [° C.] | 3 (C) DO [%] | 4 (D) Feed Rate [mL/L/d] | HP-SCX APG [%] | HP-SCX Main peak [%] | HP-SCX BPG [%] | Oligo Map Peak 3 [%] |
| DoERun 1 | 0.5 | 38 | 80 | 36.3 | 48.4307 | 41.6024 | 9.9668 | 3.3907 |
| DoERun 2 | 1 | 36.5 | 60 | 33 | 38.983 | 55.3915 | 5.6255 | 2.5953 |
| DoERun 3 | 0.5 | 38 | 40 | 33 | 40.1887 | 52.4259 | 7.3854 | 2.773 |
| DoERun 4 | 1.5 | 38 | 60 | 36.3 | 42.8188 | 51.7155 | 5.4657 | 2.4207 |
| DoERun 5 | 1.5 | 36.5 | 40 | 33 | 39.4805 | 55.7712 | 4.7483 | 2.2246 |
| DoERun 6 | 1.5 | 36.5 | 80 | 36.3 | 38.6954 | 53.0661 | 8.2384 | 2.9646 |
| DoERun 7 | 0.5 | 36.5 | 80 | 29.7 | 34.8409 | 53.5268 | 11.6322 | 3.0047 |
| DoERun 8 | 0.5 | 35 | 80 | 33 | 33.3687 | 53.1322 | 13.4991 | 3.3424 |
| DoERun 9 | 0.5 | 35 | 40 | 29.7 | 30.9043 | 58.4277 | 10.668 | 3.5845 |
| DoERun 10 | 1.5 | 35 | 80 | 29.7 | 33.7413 | 56.7309 | 9.5278 | 2.9234 |
| DoERun 11 | 1.5 | 35 | 60 | 33 | 33.9172 | 59.1234 | 6.9593 | 2.6479 |
| DoERun 12 | 1 | 36.5 | 60 | 29.7 | 37.6827 | 57.0318 | 5.2856 | 2.2165 |
| DoERun 13 | 1.5 | 35 | 40 | 36.3 | 34.9144 | 58.0599 | 7.0256 | 2.9119 |
| DoERun 14 | 1.5 | 38 | 40 | 29.7 | 44.0231 | 51.1164 | 4.8605 | 2.3038 |
| DoERun 15 | 0.5 | 35 | 60 | 36.3 | 31.5503 | 54.6764 | 13.7733 | 3.9877 |
| DoERun 16 | 1 | 36.5 | 60 | 33 | 37.4845 | 56.7758 | 5.7397 | 2.4537 |
| DoERun 17 | 1.5 | 38 | 80 | 29.7 | 43.9258 | 47.9145 | 8.1597 | 2.6825 |
| DoERun 18 | 0.5 | 38 | 60 | 29.7 | 40.3619 | 50.9505 | 8.6876 | 2.7644 |
| DoERun 19 | 1 | 38 | 80 | 33 | 43.2368 | 47.2226 | 9.5406 | 2.7673 |

TABLE 4-continued

Influence of Process Parameters on BPG and High Mannose

| | Factor | | | | Response | | | |
|---|---|---|---|---|---|---|---|---|
| Run | 1 (A) SCD [1e6cells/ mL] | 2 (B) Temper- ature [° C.] | 3 (C) DO [%] | 4 (D) Feed Rate [mL/ L/d] | HP-SCX APG [%] | HP-SCX Main peak [%] | HP-SCX BPG [%] | Oligo Map Peak 3 [%] |
| DoERun 20 | 1 | 35 | 80 | 36.3 | 35.7668 | 52.3688 | 11.864 | 3.2503 |
| DoERun 21 | 1 | 35 | 40 | 29.7 | 33.1456 | 59.6815 | 7.1729 | 2.7785 |
| DoERun 22 | 1 | 36.5 | 60 | 33 | 38.0348 | 56.1745 | 5.7907 | 2.4649 |
| DoERun 23 | 0.5 | 36.5 | 40 | 36.3 | 35.486 | 57.2048 | 7.3092 | 3.2644 |
| DoERun 24 | 1 | 38 | 40 | 36.3 | 42.8652 | 51.4559 | 5.679 | 2.5289 |

Figure 2A:
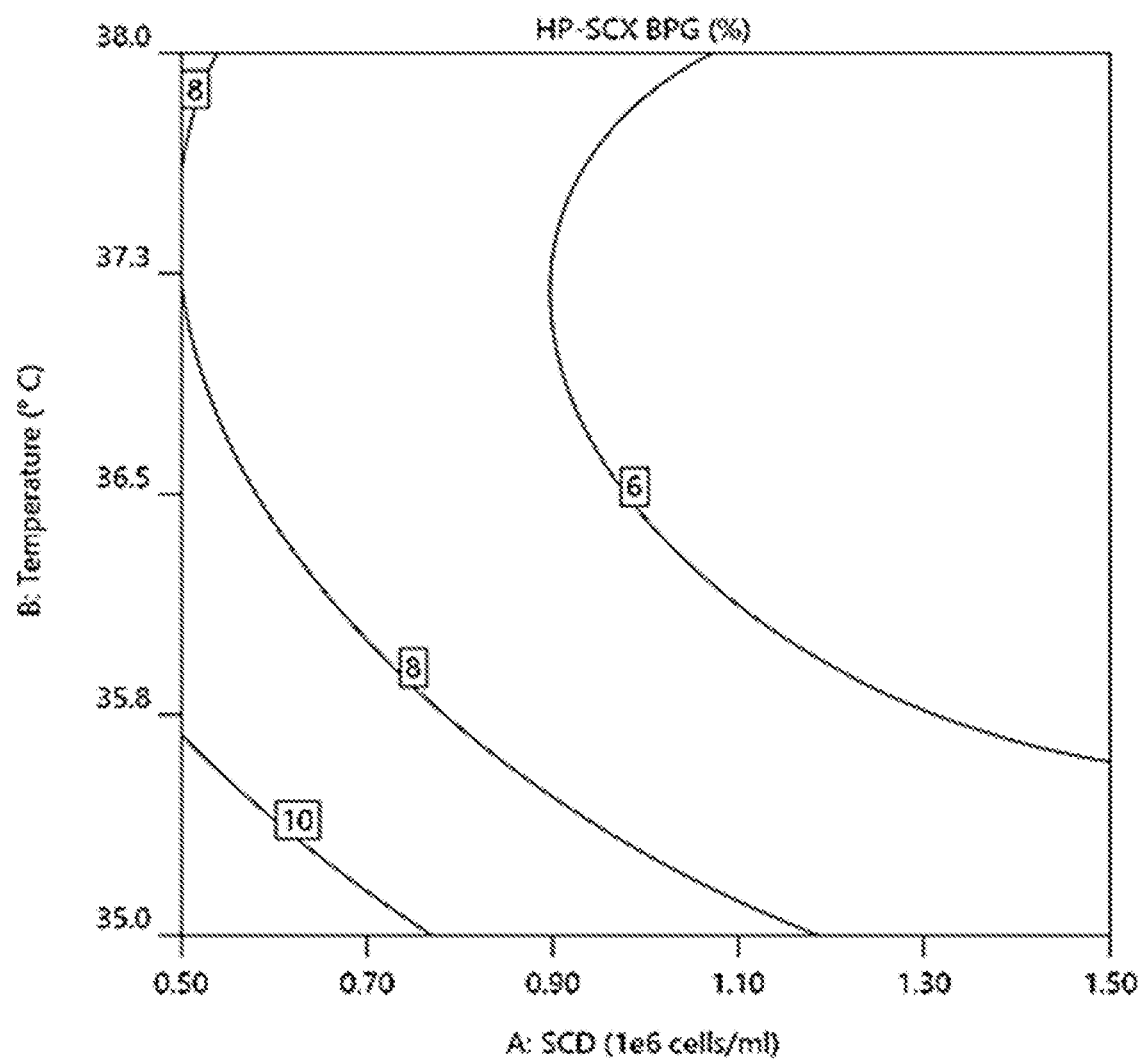
Figure 2B:
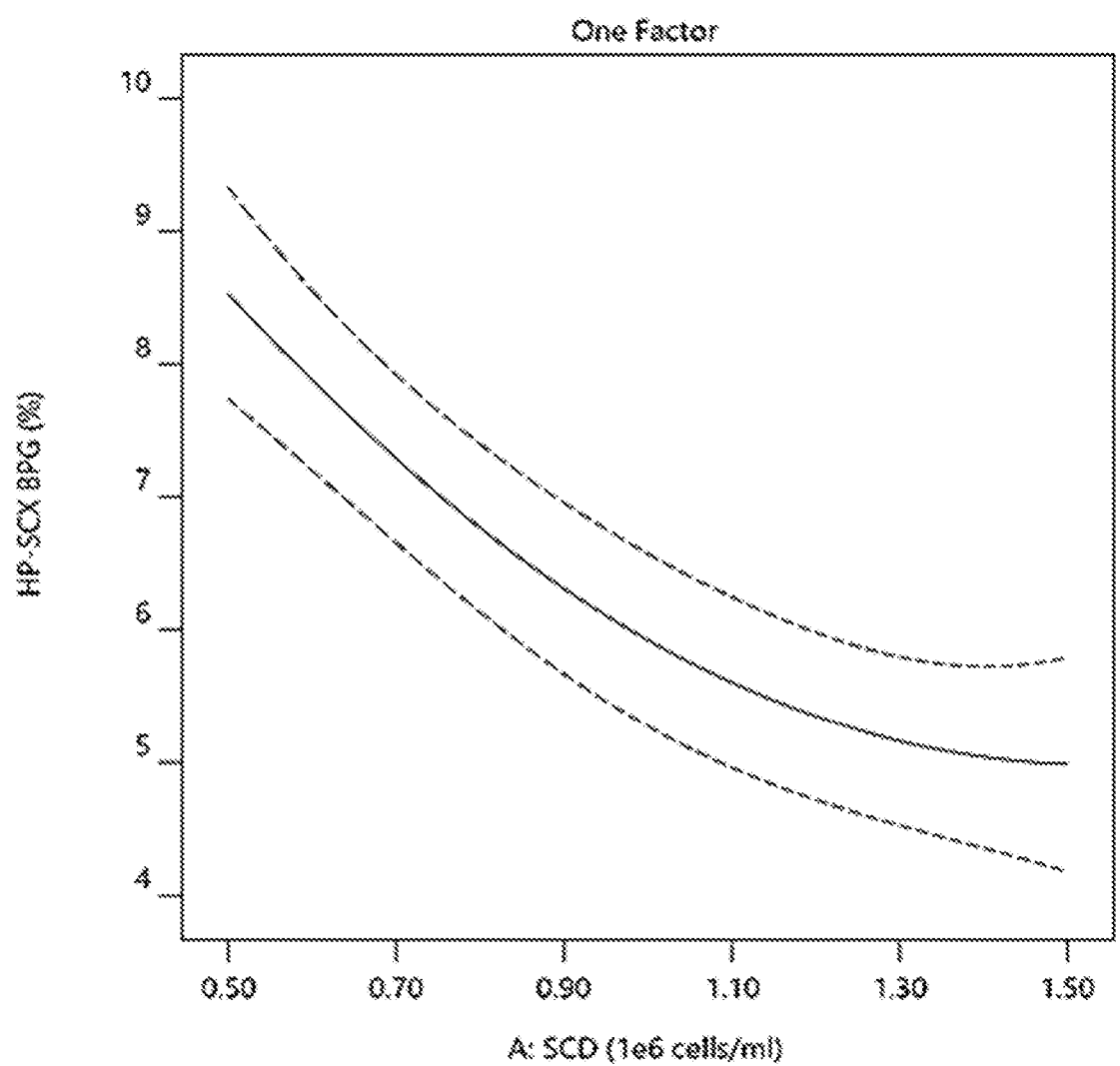
Figure 2C:
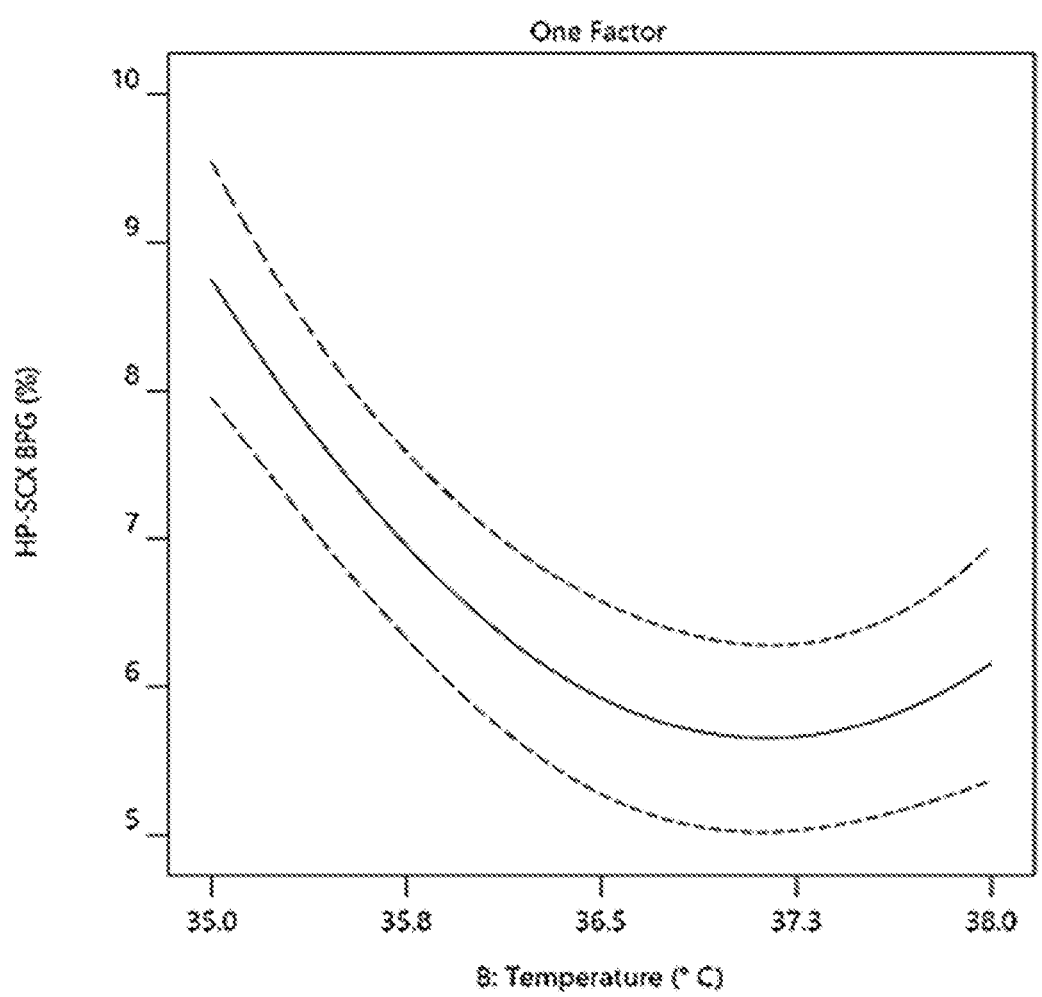
Figure 2D:
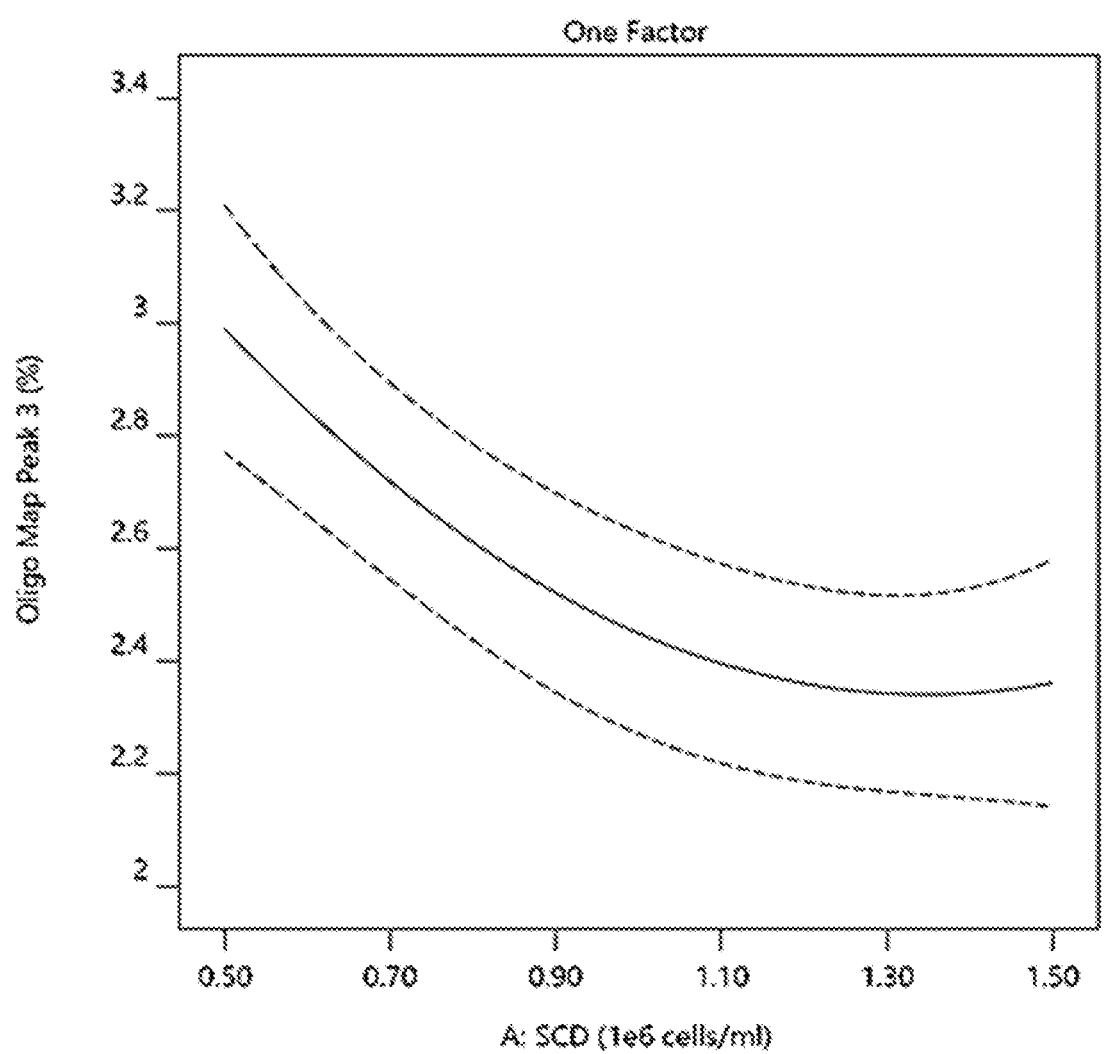
Figure 2E:
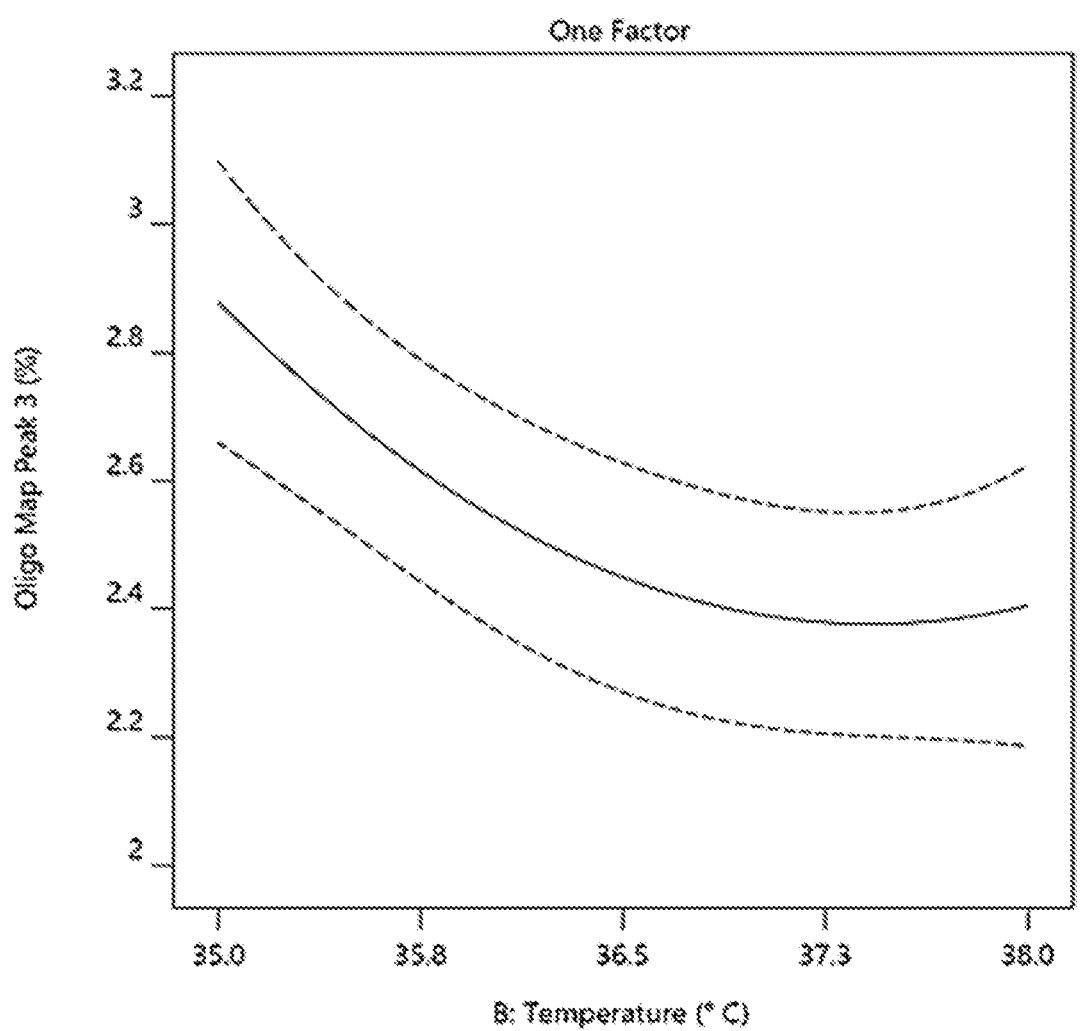
Figure 2F:
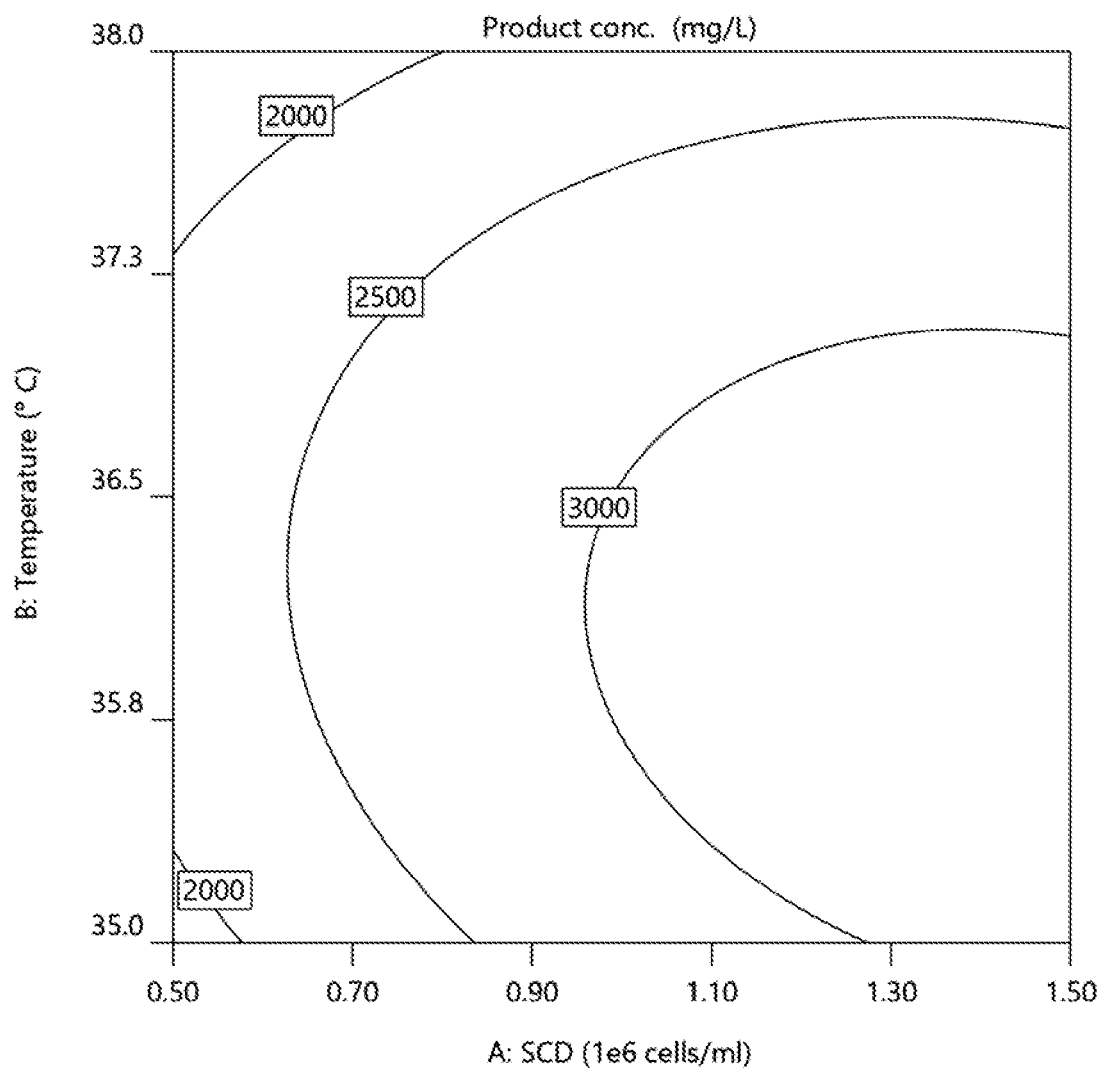
Figure 2G:
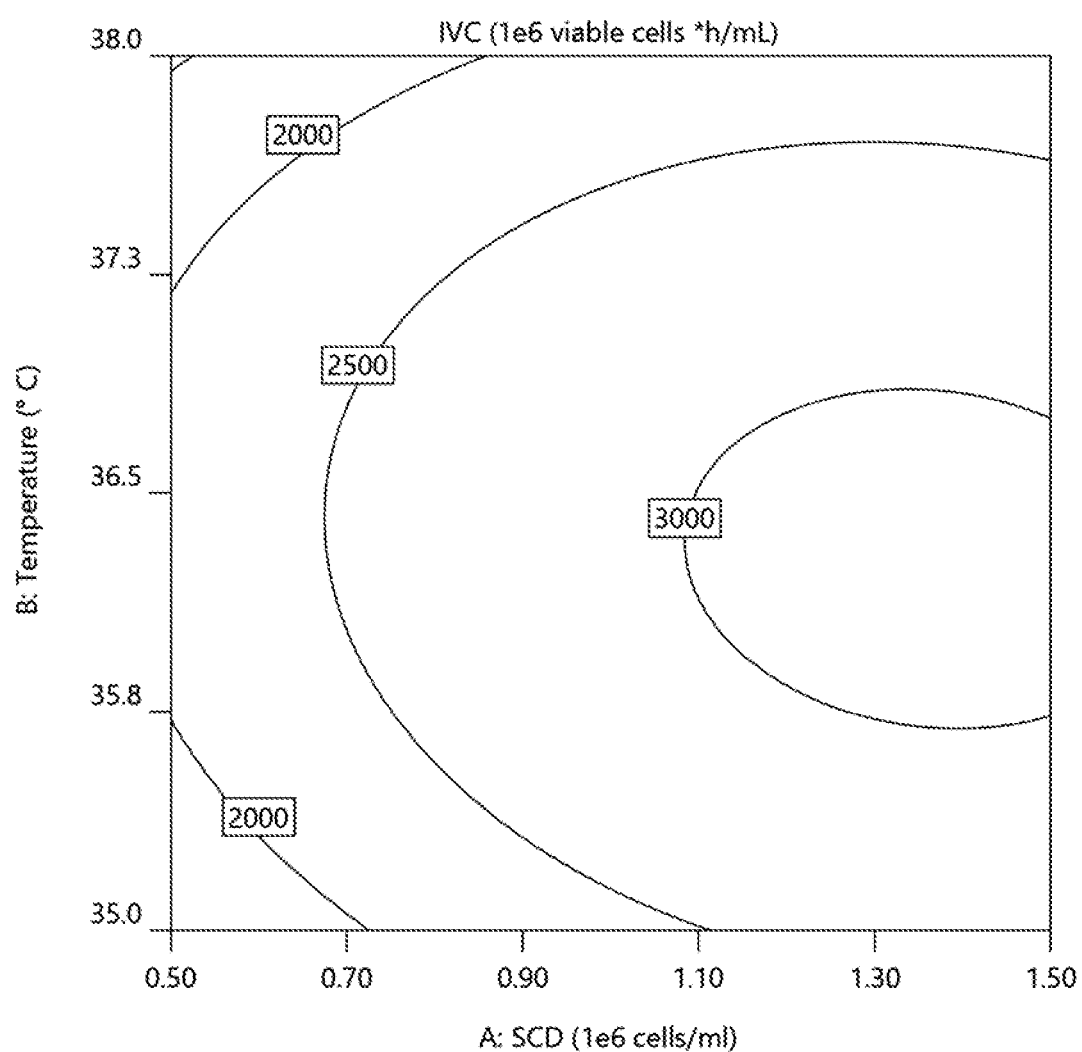
Figure 2H:
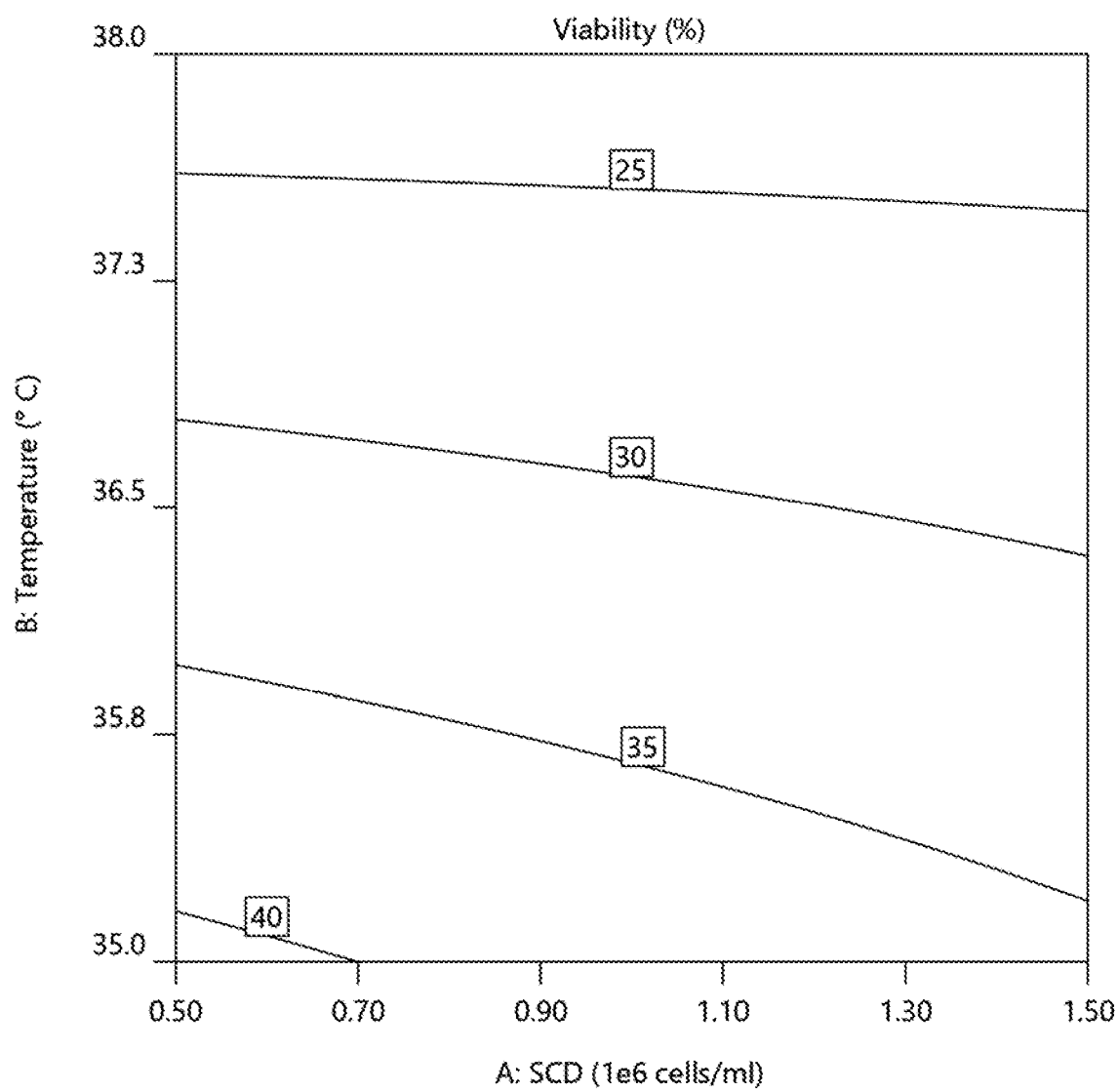
Figure 3A:
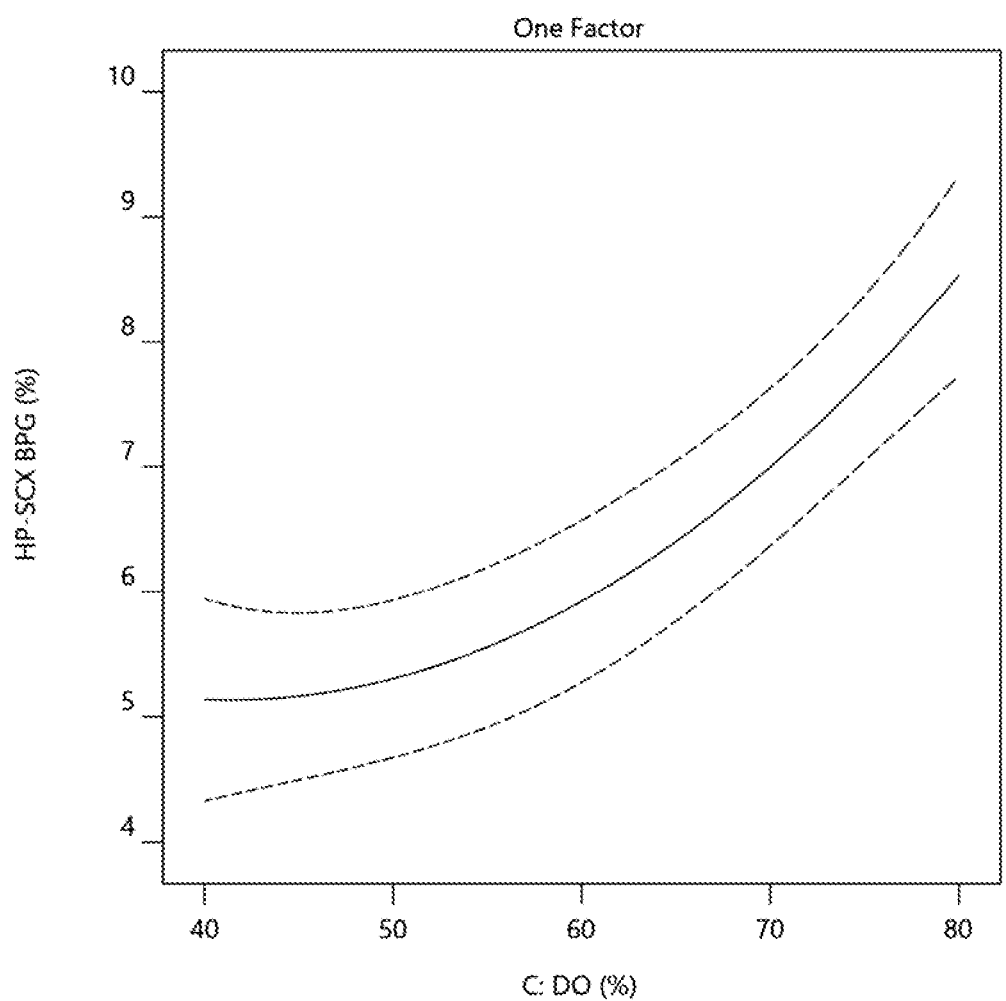
Figure 3B:
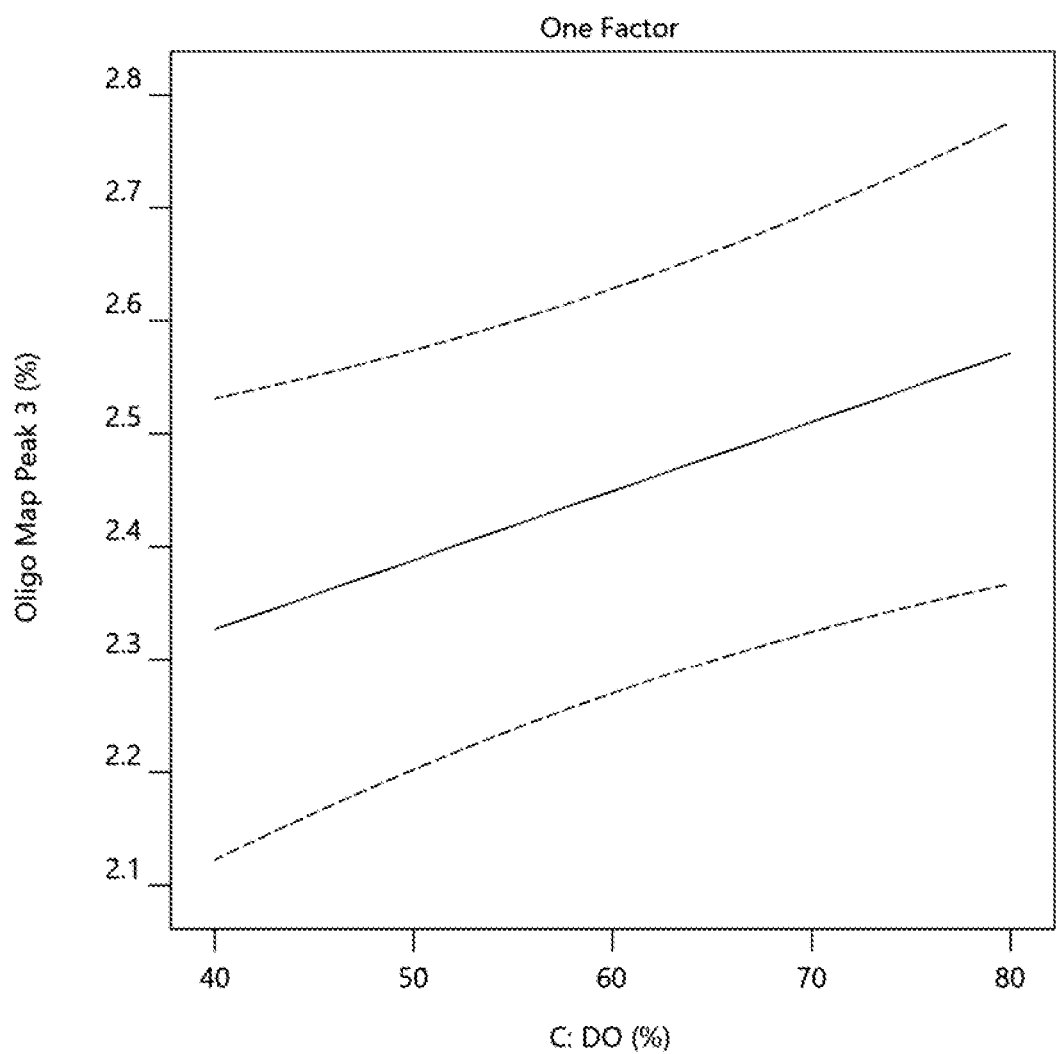
Figure 3C:
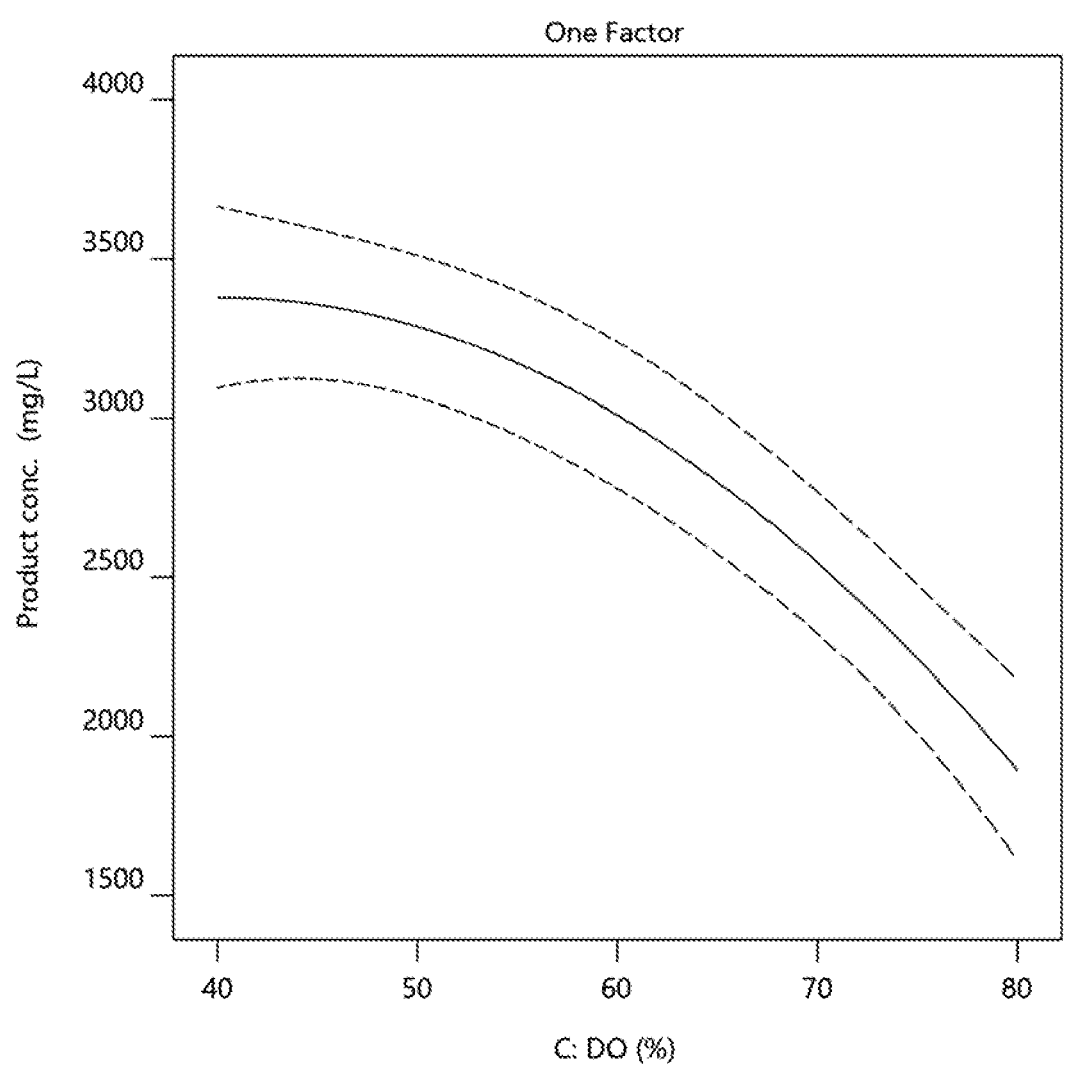
Figure 3D:
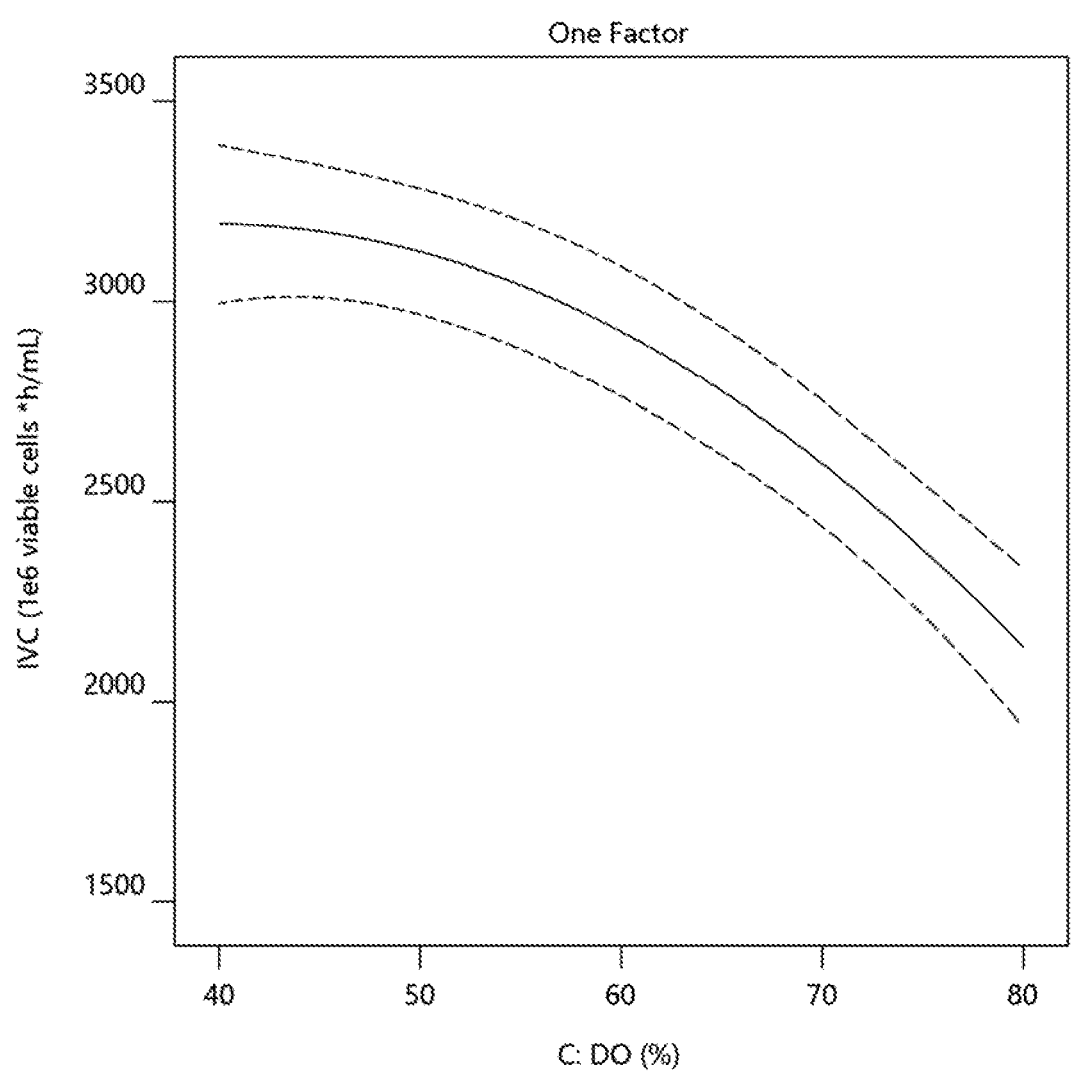

The results shown in FIG. 2A-H demonstrate that lowest BPG are reached with high seeding density and higher temperature (FIGS. 2A, B and C) and lowest high mannose (5Man) structures are similarly reached with high seeding density and low temperature (FIGS. 2D and E). Likewise, the titer (FIG. 2F) and viable cell density (FIG. 2G) increase with high seeding density and higher culture temperature. Viability after 14 days of culture seems to decrease slightly with high seeding density and higher culture temperature (FIG. 2H), but this does not seem to negatively affect the titer. The results shown in FIG. 3A-D demonstrate that also reduction of dissolved oxygen has a beneficial effect on BPG (FIG. 3A), high mannose structures (FIG. 3B), titer (FIG. 3C) and viable cell density (FIG. 3D).

Example 3

IL36 and FcRN Binding of Different Heterogenic Variants (APG/BPG)

In order to determine the potency of the CEX fractions collected for Spesolimab, IL36R binding (SPR) and the IL36R bioassay were conducted (Table 5).

Most of the isolated CEX fractions show a potency comparable to the potency of the Drug Substance source material. A reduced potency was observed for the most acidic fraction AP4 and—to a lesser extent—for the acidic fraction AP3b (the same holds true for FcRn binding (SPR)). Both fractions and especially fraction AP4 show a rather indistinct elution profile (FIGS. 4A and B), and have a low relative abundance <1% (Table 5).

Similarly, the most basic fraction BP3 also shows a rather indistinct elution profile ((FIGS. 4A and B) with a low relative abundance less than 1.5% (Table 5). Within IL36R binding (SPR) this fraction showed a reduced recovery, meaning a reduced binding to the protein A/G sensor chip which fits to the increase of oligomers observed within this fractions shown in FIG. 4C.

TABLE 5

IL36R bioassay, IL36R binding (SPR), and FcRn binding (SPR) of the CEX fractions collected for Spesolimab.

| | CEX Relative amount of total area in CEX [%] | IL36R bioassay Potency [%] | IL36R binding (SPR) | | FcRn binding (SPR) Binding [%] |
|---|---|---|---|---|---|
| | | | Recovery [a] [%] | Potency [b] [%] | |
| AP4 fraction | 0.5 | 60 | 75 | 93 | 69 |
| AP3b fraction | 0.8 | 80 | 87 | 93 | 84 |
| AP3a fraction | 2.8 | 91 | 88 | 98 | 88 |
| AP2 fraction | 2.4 | 94 | 90 | 99 | n.a. |
| AP1c fraction | 2.2 | 102 | 90 | 100 | 90 |
| AP1b fraction | 7.6 | 99 | 92 | 100 | 89 |
| AP1a fraction | 13.6 | 102 | 93 | 99 | 92 |
| MP fraction | 62.5 | 110 | 95 | 102 | 95 |
| BP1 fraction | 3.75 | 97 | 93 | 100 | 95 |
| BP2 fraction | 2.4 | 97 | 84 | 100 | 91 |
| BP3 fraction | 1.3 | n.a. | 70 | 100 | n.a. |
| CMC2 source | N/A | 91 | 93 | 101 | 94 | n.a. = not analyzed (due to ack of material)
[a] The recovery states the a mount of species binding to protein A/G immobilized on the sensor chip (first step of SPR assay).
[b] Potency states the IL36R binding activity of the species bound to protein A/G (second step of SPR assay).

BPG Species

The basic peak group comprises among others different N-terminal and C-terminal charge variants. Observed N-terminal charge variants are Spesolimab containing an N-terminal glutamine instead of an N-terminal pyro-glutamine (mainly observed on the N-terminus of the light chain in fraction BP2, but also observed to a lesser extent at the N-terminus of the heavy chain in fraction BP1). Furthermore, Spesolimab containing the additional amino acids VHS at the N-terminus of the heavy chain is enriched in fraction BP3 (remnant of the N-terminal signal peptide). Observed C-terminal charge variants are Spesolimab containing an additional lysine at the C-terminus of one (fraction BP1) or both (fraction BP3) heavy chains. Furthermore, Spesolimab containing a proline amide at the C-terminus of one (fraction BP1) or both (fraction BP3) heavy chains is enriched (generated by removal of the C-terminal glycine and amidation of the adjacent proline).

APG Species

The acidic peak group, comprises among others Spesolimab carrying N-glycans containing N-acetylneuraminic acid (NANA) and/or Spesolimab carrying a deamidation at N386+N391+N392 (HC). Additionally, moderate enrichment of a fragment putatively consisting of Spesolimab missing one light chain is observed within the more acidic peaks.

Example 4

Lysine Glycated Variants

Glycation is the result of the formation of various types of covalent adducts, where glucose can react with the primary amine either of a lysine residue or the N-terminus resulting in the formation of an acidic variants. Glycation of spesolimab occurs during upstream manufacturing as glucose is contained in the culture media. Glycated species may be generated in the cell culture and at harvest where the cells and the spesolimab molecule are exposed to higher hexose levels. No reducing sugars are applied in the downstream manufacturing process, but may be present or formed in the pharmaceutical formulation, i.e., the drug product.

The susceptibility of a lysine residue to glycation is determined by the solvent accessibility (tertiary structure) and chemical environment of its side chain (primary and secondary structures). In IgGs, the majority of glycation is distributed over greater than 30 lysine residues (Miller A K, Hambly D M, Kerwin B A, Treuheit M J, Gadgil H S, Journal of Pharmaceutical Sciences, 2011, 100(7): 2543-2550). Spesolimab has 11 lysine residues in the light chain (LC; SEQ ID NO:2) and 33 lysine residues in the heavy chain (HC; SEQ ID NO: 1) that might undergo glycation. Since there are 3 lysine residues close to the CDRs of the heavy chain (potentially critical lysins: HC-K23, K38, K67; SEQ ID NO: 1), glycation might be critical for efficacy/potency of the antibody.

Sum of Glycation via Relative Quantification with LC-MS (Reduced)

To determine the relative quantification of reduced sum glycation with LC-MS Spesolimab 100 µL samples diluted to 1 mg/mL were treated with 1 µL (1U/µL) N-Glycosidase F (Roche P011365193001 or equivalent) to remove the N-linked oligosaccharides before reduction with 1 µL of 1 M DTT. Reduction is performed for 20 min at 57° C. The resulting LC and deglycosylated HC were separated by reversed phase-high performance chromatography (RP-HPLC) and analyzed online by ESI Q-TOF MS (Xevo G2 Q-TOF). The protein subunits and the corresponding glucose adducts (Mglucose addition=162 Da) are analyzed and the acquired spectra are deconvoluted using MaxEnt™ algorithm (Table 6).

TABLE 6

Glycated Lysine variants by LC-MS

| Variants | Representative Relative distribution (%) from drug substance |
|---|---|
| Light chain | |
| Non-glycated | 99 |
| glycated | 1 |
| Heavy chain | |
| Non-glycated | 97 |
| glycated | 3 |

Relative Quantification with LC-MS (Single Glycation Site)

To determine relative quantification of single glycation sites with LC-MS, samples were denatured and buffer exchanged into Tris guanidinium hydrochloride buffer (dilution of samples to 1 mg/mL with 7M guanidinium hydrochloride/100 mM Tris/HCl, pH 8.3), reduced with dithriotheitol (DTT, final concentration: 10 mM) for 20 minutes at 57° C. and alkylated with iodacetic acid (IAA, final concentration: 10 mM) for 20 minutes at room temperature in the dark. Afterwards, the reaction was quenched by addition of 50 mM DTT. After reduction and alkylation, samples were again buffer exchanged into 100 mM ammonium bicarbonate buffer, and enzymatically digested using chymotrypsin in the presence of a surfactant. The reaction is stopped after 30 min at 37° C. by addition of formic acid (1:120, volume:volume). The peptides are separated by reversed phase liquid chromatography and analyzed by ESI-MS. The relative amount of glycated peptides are quantified (Table 7) based on the extracted ion chromatograms of the wild-type peptides and the peptides carrying a glucose adduct (+162 Da).

TABLE 7

Single Lysin Glycation distribution over the molecule

| | Lysin Residue | % Glycated Lysine |
|---|---|---|
| HC | K12 + K13 + K19 + K23[a], [c], [d] | 0.3 |
| | K38[a] | n.d. |
| | K67[a] | n.d. |
| | K123 + K135[c] | 0.1 |
| | K149[b] | 0.4 |
| | K207 | 0.1 |
| | K212 + K215 + K220 + K224[c] | 0.2 |
| | K248 + K250 | 0.4 |
| | K276 | 0.1 |
| | K290 | n.d. |
| | K319 | 0.1 |
| | K322 + K324 + K328 + K336[b], [c] | 0.3 |
| | K328 + K336[b] | 0.2 |
| | K336 + K340 + K342[c] | 0.0 |
| | K340 + K342[c] | 0.0 |
| | K362 | n.d. |
| | K372 | 0.0 |
| | K394 | 0.0 |
| | K416 | 0.0 |
| LC | K40 | 0.0 |
| | K104[b] | 0.1 |
| | K104 + K108[b], [c] | 0.0 |
| | K127 | 0.1 |
| | K146 | 0.0 |
| | K150 + K170[b], [c] | 0.3 |
| | K184 | 0.2 |
| | K184 + K189 + K191[b], [c] | 1.4 |
| | K208 | n.d. |

[a]close to CDR,
[b]increased glycation under high glucose stress conditions (e.g. 0.5 M glucose),
[c]lysines are within the same peptide and are only analysed together without distinguishing between the residues,
[d]some glycation under high glucose stress condition (e.g. 0.5 M glucose), Glycated lysine variants for heavy chain and light chain are on a low level of ≤3% and ≤1%, respectively, but detectable (Table 6) and in the lower range typically found in literature for recombinant IgGs of 5-15% (Eon-Duval A et al, J Pharm Sci., 2012, 101(10): 3604-3618). It was further surprisingly found that glycation on critical residues are below the detection limit or for K23 below 0.3% (Table 7, critical residues are highlighted in bold).

While certain aspects and embodiments of the invention have been described, these have been presented by way of example only, and are not intended to limit the scope of the invention. Indeed, the novel methods and systems described herein may be embodied in a variety of other forms without departing from the spirit thereof. The accompanying claims and their equivalents are intended to cover such forms or modifications as would fall within the scope and spirit of the invention.

All patents and/or publications including journal articles cited in this disclosure are expressly incorporated herein by reference.

The invention claimed is:

1. A method for producing the antibody spesolimab in cell culture comprising
   (a) cultivating CHO cells comprising a nucleic acid encoding the antibody spesolimab in a serum-free cell culture medium using fed-batch culture in final N-stage, comprising
      (i) seeding the cells in a culture medium, wherein the culture medium is a basal medium, and
      (ii) culturing the cells in the culture medium under conditions that allow production of the antibody spesolimab in the cell culture comprising feeding the cells in the cell culture with a feed medium,
   wherein $Cu^{2+}$ is added at 0.35-1.2 μM and iron at 1500 μM or more to the culture medium in step (i), with the basal medium in step (i) or within 2 days after seeding, or a combination thereof;
   (b) harvesting the cell culture supernatant comprising the antibody spesolimab; and
   (c) purifying the antibody spesolimab from the cell culture supernatant;
   wherein an increased iron concentration and a decreased copper concentration added to the culture medium results in the production of the antibody spesolimab having reduced % basic peak group (% BPG) relative to when the antibody spesolimab is produced by the same method using iron concentrations below 1500 μM and copper concentrations above 1.2 μM, wherein % BPG refers to % relative peak area of total sum peak area as determined by cation exchange chromatography (CEX) in an HPLC chromatogram of the spesolimab profile.

2. The method of claim 1, wherein the $Cu^{2+}$ and the iron are added to the culture medium in step (i), with the basal medium in step (i), or within 1 day after seeding, or a combination thereof.

3. The method of claim 1, wherein the antibody spesolimab has≤7.5% BPG, wherein % BPG refers to % relative peak area of total sum peak area as determined by cation exchange chromatography (CEX) in an HPLC chromatogram of the spesolimab profile.

4. The method of claim 1, wherein the seeding in step (a) is at a density of $\geq 0.7 \times 10^6$ cells/ml.

5. The method of claim 1, wherein the seeding in step (a) is at a density of $0.7 \times 10^6$ cells/ml to $1.5 \times 10^6$ cells/ml.

6. A method for producing the antibody spesolimab in cell culture comprising
  (a) cultivating CHO cells comprising a nucleic acid encoding the antibody spesolimab in a serum-free cell culture medium using fed-batch culture in final N-stage, comprising
    (i) seeding the cells in a culture medium at a cell density of $\geq 0.7 \times 10^6$ cells/ml,
    wherein the culture medium is a basal medium, and
    (ii) culturing the cells in the culture medium under conditions that allow production of the antibody spesolimab in the cell culture comprising feeding the cells in the cell culture with a feed medium,
    wherein $Cu^{2+}$ is added at 0.35-1.2 μM and iron at 1500 μM or more to the culture medium in step (i), with the basal medium in step (i) or within 2 days after seeding, or a combination thereof;
  (b) harvesting the cell culture supernatant comprising the antibody spesolimab; and
  (c) purifying the antibody spesolimab from the cell culture supernatant;
  wherein an increased iron concentration and a decreased copper concentration added to the culture medium results in the production of the antibody spesolimab having reduced % basic peak group (% BPG), relative to when the antibody spesolimab is produced by the same method using iron concentrations below 1500 μM and copper concentrations above 1.2 μM, wherein % BPG refers to % relative peak area of total sum peak area as determined by cation exchange chromatography (CEX) in an HPLC chromatogram of the spesolimab profile.

7. The method of claim 6, wherein an increased seeding density results in the production of the antibody spesolimab having reduced % basic peak group (% BPG) and % Man5 structures, wherein % BPG refers to % relative peak area of total sum peak area as determined by cation exchange chromatography (CEX) in an HPLC chromatogram of the spesolimab profile.

8. The method of claim 6, wherein (i) the cells are cultured at 36.0° C. to 37.5° C. under conditions that allow production of the antibody spesolimab comprising feeding the cells with a feed medium, or (ii) wherein the dissolved oxygen (DO) concentration in said culture is maintained within a range of 30-60%, or both (i) and (ii).

9. The method of claim 6, wherein an (i) increased culture temperature or (ii) reduced dissolved oxygen or both (i) and (ii) results in the production of the antibody spesolimab having reduced % BPG and % Man5 structures, wherein % BPG refers to % relative peak area of total sum peak area as determined by cation exchange chromatography (CEX) in an HPLC chromatogram of the spesolimab profile.

10. The method of claim 6, wherein the antibody spesolimab has less than 5% Man5 structures, and ≤7.5% BPG, wherein % BPG refers to % relative peak area of total sum peak area as determined by cation exchange chromatography (CEX) in an HPLC chromatogram of the spesolimab profile.

* * * * *

SEQUENCE LISTING

```
<160> NUMBER OF SEQ ID NOS: 4

<210> SEQ ID NO 1
<211> LENGTH: 449
<212> TYPE: PRT
<213> ORGANISM: Artificial Sequence
<220> FEATURE:
<223> OTHER INFORMATION: Spesolimab heavy chain amino acid sequence

<400> SEQUENCE: 1

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
                20                  25                  30

Trp Ile His Trp Val Lys Gln Ala Pro Gly Gln Gly Leu Glu Trp Met
            35                  40                  45

Gly Glu Ile Asn Pro Gly Asn Val Arg Thr Asn Tyr Asn Glu Asn Phe
        50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
                100                 105                 110

Thr Leu Val Thr Val Ser Ser Ala Ser Thr Lys Gly Pro Ser Val Phe
            115                 120                 125

Pro Leu Ala Pro Ser Ser Lys Ser Thr Ser Gly Gly Thr Ala Ala Leu
        130                 135                 140

Gly Cys Leu Val Lys Asp Tyr Phe Pro Glu Pro Val Thr Val Ser Trp
145                 150                 155                 160

Asn Ser Gly Ala Leu Thr Ser Gly Val His Thr Phe Pro Ala Val Leu
                165                 170                 175

Gln Ser Ser Gly Leu Tyr Ser Leu Ser Ser Val Val Thr Val Pro Ser
                180                 185                 190

Ser Ser Leu Gly Thr Gln Thr Tyr Ile Cys Asn Val Asn His Lys Pro
            195                 200                 205

Ser Asn Thr Lys Val Asp Lys Arg Val Glu Pro Lys Ser Cys Asp Lys
        210                 215                 220

Thr His Thr Cys Pro Pro Cys Pro Ala Pro Glu Ala Ala Gly Gly Pro
225                 230                 235                 240

Ser Val Phe Leu Phe Pro Pro Lys Pro Lys Asp Thr Leu Met Ile Ser
                245                 250                 255

Arg Thr Pro Glu Val Thr Cys Val Val Val Asp Val Ser His Glu Asp
                260                 265                 270

Pro Glu Val Lys Phe Asn Trp Tyr Val Asp Gly Val Glu Val His Asn
            275                 280                 285

Ala Lys Thr Lys Pro Arg Glu Glu Gln Tyr Asn Ser Thr Tyr Arg Val
        290                 295                 300

Val Ser Val Leu Thr Val Leu His Gln Asp Trp Leu Asn Gly Lys Glu
305                 310                 315                 320

Tyr Lys Cys Lys Val Ser Asn Lys Ala Leu Pro Ala Pro Ile Glu Lys
                325                 330                 335
```

Thr Ile Ser Lys Ala Lys Gly Gln Pro Arg Glu Pro Gln Val Tyr Thr
                340                 345                 350

Leu Pro Pro Ser Arg Glu Glu Met Thr Lys Asn Gln Val Ser Leu Thr
                355                 360                 365

Cys Leu Val Lys Gly Phe Tyr Pro Ser Asp Ile Ala Val Glu Trp Glu
        370                 375                 380

Ser Asn Gly Gln Pro Glu Asn Asn Tyr Lys Thr Thr Pro Pro Val Leu
385                 390                 395                 400

Asp Ser Asp Gly Ser Phe Phe Leu Tyr Ser Lys Leu Thr Val Asp Lys
                405                 410                 415

Ser Arg Trp Gln Gln Gly Asn Val Phe Ser Cys Ser Val Met His Glu
                420                 425                 430

Ala Leu His Asn His Tyr Thr Gln Lys Ser Leu Ser Leu Ser Pro Gly
                435                 440                 445

Lys

<210> SEQ ID NO 2
<211> LENGTH: 215
<212> TYPE: PRT
<213> ORGANISM: Artificial Sequence
<220> FEATURE:
<223> OTHER INFORMATION: Spesolimab light chain amino acid sequence

<400> SEQUENCE: 2

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
                20                  25                  30

Tyr Phe His Trp Tyr Gln Gln Lys Pro Gly Gln Ala Pro Arg Leu Trp
            35                  40                  45

Ile Tyr Arg Thr Ser Arg Leu Ala Ser Gly Val Pro Asp Arg Phe Ser
        50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Ala Gly Thr Lys Leu Glu Ile Lys Arg Thr Val Ala
                100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
        130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
                180                 185                 190

Tyr Ala Cys Glu Val Thr His Gln Gly Leu Ser Ser Pro Val Thr Lys
            195                 200                 205

Ser Phe Asn Arg Gly Glu Cys
        210                 215

<210> SEQ ID NO 3
<211> LENGTH: 119

```
<212> TYPE: PRT
<213> ORGANISM: Artificial Sequence
<220> FEATURE:
<223> OTHER INFORMATION: Spesolimab variable heavy chain amino acid
      sequence

<400> SEQUENCE: 3

Gln Val Gln Leu Val Gln Ser Gly Ala Glu Val Lys Lys Pro Gly Ala
1               5                   10                  15

Ser Val Lys Val Ser Cys Lys Ala Ser Gly Tyr Ser Phe Thr Ser Ser
            20                  25                  30

Trp Ile His Trp Val Lys Gln Ala Pro Gly Gln Gly Leu Glu Trp Met
        35                  40                  45

Gly Glu Ile Asn Pro Gly Asn Val Arg Thr Asn Tyr Asn Glu Asn Phe
    50                  55                  60

Arg Asn Lys Val Thr Met Thr Val Asp Thr Ser Ile Ser Thr Ala Tyr
65                  70                  75                  80

Met Glu Leu Ser Arg Leu Arg Ser Asp Asp Thr Ala Val Tyr Tyr Cys
                85                  90                  95

Thr Val Val Phe Tyr Gly Glu Pro Tyr Phe Pro Tyr Trp Gly Gln Gly
            100                 105                 110

Thr Leu Val Thr Val Ser Ser
        115

<210> SEQ ID NO 4
<211> LENGTH: 108
<212> TYPE: PRT
<213> ORGANISM: Artificial Sequence
<220> FEATURE:
<223> OTHER INFORMATION: Spesolimab variable light chain amino acid
      sequence

<400> SEQUENCE: 4

Gln Ile Val Leu Thr Gln Ser Pro Gly Thr Leu Ser Leu Ser Pro Gly
1               5                   10                  15

Glu Arg Ala Thr Met Thr Cys Thr Ala Ser Ser Ser Val Ser Ser Ser
            20                  25                  30

Tyr Phe His Trp Tyr Gln Gln Lys Pro Gly Gln Ala Pro Arg Leu Trp
        35                  40                  45

Ile Tyr Arg Thr Ser Arg Leu Ala Ser Gly Val Pro Asp Arg Phe Ser
    50                  55                  60

Gly Ser Gly Ser Gly Thr Asp Phe Thr Leu Thr Ile Ser Arg Leu Glu
65                  70                  75                  80

Pro Glu Asp Ala Ala Thr Tyr Tyr Cys His Gln Phe His Arg Ser Pro
                85                  90                  95

Leu Thr Phe Gly Ala Gly Thr Lys Leu Glu Ile Lys
            100                 105
```